(12) United States Patent
Seputis

(10) Patent No.: US 6,353,826 B1
(45) Date of Patent: Mar. 5, 2002

(54) DATABASE SYSTEM WITH METHODOLOGY PROVIDING IMPROVED COST ESTIMATES FOR QUERY STRATEGIES

(75) Inventor: Edwin Anthony Seputis, Oakland, CA (US)

(73) Assignee: Sybase, Inc., Emeryville, CA (US)

( * ) Notice: Subject to any disclaimer, the term of this patent is extended or adjusted under 35 U.S.C. 154(b) by 0 days.

(21) Appl. No.: 09/384,729

(22) Filed: Aug. 27, 1999

Related U.S. Application Data

(63) Continuation-in-part of application No. 08/956,631, filed on Oct. 23, 1997, now Pat. No. 6,012,054.
(60) Provisional application No. 60/098,266, filed on Aug. 28, 1998.

(51) Int. Cl.$^7$ .............................................. G06F 17/30
(52) U.S. Cl. ......................... 707/5; 707/3; 707/4; 707/2
(58) Field of Search ............................... 707/2, 1, 3, 4, 707/101, 200, 104, 10, 102, 5

(56) References Cited

U.S. PATENT DOCUMENTS

| | | | |
|---|---|---|---|
| 4,956,774 A | | 9/1990 | Shibamiya et al. |
| 5,689,696 A | | 11/1997 | Gibbons et al. |
| 5,732,107 A | | 3/1998 | Phillips et al. |
| 5,799,311 A | | 8/1998 | Agrawal et al. |
| 5,822,456 A | | 10/1998 | Reed et al. |
| 5,913,207 A | * | 6/1999 | Chaudhuri et al. ............ 707/2 |
| 5,913,506 A | * | 6/1999 | Chaudhuri et al. ............ 707/2 |
| 6,012,054 A | * | 1/2000 | Sputis .......................... 707/3 |
| 6,029,163 A | * | 2/2000 | Ziauddin ....................... 707/1 |

OTHER PUBLICATIONS

Haas et al., "Sampling based selectivity estimation for joins using augmented frequent value statistics," IEEE, Data Engineering, 1995, Proceedings of the eleven international conference, pp. 522–531, Mar. 6–10, 1995.*

Aboulnaga et al., "Accurate estimation of the cost of spatial selections," IEEE, Data Engineering, 2000 Proceedings. 16$^{th}$ international conference, pp. 123–134, Feb. 29–Mar. 3, 2000.*

Wang et al., "Selectivity extimation in the presence of alphanumeric correlations," IEEE, Data Engineering, 1997, Proceedings. 13$^{th}$ international conference, pp. 169–180, Apr. 7–11, 1997.*

Poosala, V., et al., "Improved Histograms for Selectivity Estimation of Range Predicates," ACM SIGMOD '96, Montreal, Canada, 1996, pp. 294–305.

Piatetshy–Shapiro, G., et al., "Accurate Estimation of the Number of Tuples Satisfying a Condition," ACM, 1984, pp. 256–276.

Mannino, M., et al., "Statistical Profile Estimation in Database Systems," ACM Computing Surveys, vol. 20, No. 3, Sep. 1988, pp. 191–221.

* cited by examiner

*Primary Examiner*—Jean M. Corrielus
(74) *Attorney, Agent, or Firm*—John A. Smart

(57) ABSTRACT

Database system and methods are described for improving execution speed of database queries (e.g., for decision support). A multi-attribute selectivity optimization methodology is described that provides a more accurate estimate of the cost of a query execution plan, so that the predicted performance of the final execution plan will be more accurate. The densities by how much the selectivity deviates from a single attribute density and by how much the multi-attribute densities differ from one another are used as a basis for multi-selectivity estimates. The multi-attribute densities are used to scale estimates between extremes of total independence and total dependence. By taking into account how well attributes are correlated, the approach is able to provide more accurate multi-selectivity estimates. As a result, the database system can formulate better query plans and, thus, provide better performance.

20 Claims, 11 Drawing Sheets

DATABASE SYSTEM WITH METHODOLOGY PROVIDING IMPROVED COST ESTIMATES FOR QUERY STRATEGIES

RELATED APPLICATIONS

The present application claims the benefit of priority from and is related to the following commonly-owned U.S. provisional application: application Ser. No. 60/098,266, filed Aug. 28, 1998. Further, the present application is a continuation-in-part of commonly-owned U.S. application Ser. No. 08/956,631, filed Oct. 23, 1997 now U.S. Pat. No. 6,012,054. The disclosure of the foregoing applications are hereby incorporated by reference in its entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to improved system performance during retrieval of information stored in a data processing system, such as a Relational Database Management System (RDBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

RDBMS systems have long since moved from a centralized mainframe environment to a de-centralized or distributed environment. One or more PC "client" systems, for instance, may be connected via a network to one or more server-based database systems (SQL database server). Commercial examples of these "client/server" systems include Powersoft™ clients connected to one or more Sybase®) Adaptive Server™ (formerly Sybase® SQL Server™) database servers. Both Powersoft™ and Sybase® Adaptive Server™ are available from Sybase, Inc. of Emeryville, Calif. As the migration to client/server systems continues, each day more and more businesses are run from mission-critical systems which store information on server-based SQL database systems, such as Sybase® Adaptive Server™. As a result, increasingly higher demands are being placed on server-based SQL database systems to provide enterprise-wide decision support—providing timely on-line access to critical business information (e.g., through "queries").

At its core, every RDBMS system includes certain modules which perform basic tasks, including a parser, an optimizer, an execution engine, and a data manager. A parser reads client statements and transforms them into an internal representation. An optimizer takes the internal representation of the statement and looks at several alternative strategies for obtaining the correct response, an "answer" from the underlying database. The choices made by the optimizer have a profound impact on a system's response time for the client. Improper choice, for instance, can delay response time by seconds, minutes, or hours. The job of the optimizer is, therefore, to make the best choice using estimations based on the "cost" of various strategies. The execution engine employs the execution strategy formulated by the optimizer to obtain the correct response and give the results to the client. During operation, the execution engine submits requests to the data manager to obtain information from tables. This is done in a manner that was determined by the optimizer, for instance, using available indices, performing table scans, or the like.

In today's information-based economy, on-line database systems are critical for running the day-to-day operations of a business, whether for decision support or for on-line transaction processing. Accordingly, there has been great interest in the area of improving the speed by which these systems execute database queries. The underlying performance of a database system is closely tied to its optimizer, which, in turn, is closely tied to the cost estimates which the optimizer adopts. Consider, for instance, a cost estimate of an optimizer which inaccurately predicts that a particular operation requires only a few seconds, when in fact the operation takes minutes or hours. This type mistake is often magnified in the context of a complex query, where the particular operation might occur hundreds or thousands of times. The end result of the mistake is unacceptable system performance. If, on the other hand, the accuracy of the estimates of the cost of a particular strategy provided by the optimizer is improved, the predicted performance of the final execution plan will be more accurate. In this case, the result is better performance of the RDBMS system. The system exhibits better throughput and response time for queries, including DSS (Decision Support System) queries.

The cost estimates provided by optimizers in present-day RDBMS systems are not particularly accurate. This results in poor execution plan strategies being selected. Attempts to address the problem have focused on "workarounds" for poor optimizer plan selection. Here, systems allow a DBA (Database Administrator) to explicitly override the optimizer's selection with a "force plan option" or "force index option." Such an approach entails significant disadvantages, however. Overriding an optimizer is a highly-skilled, labor-intensive task and, as a result, a very costly proposition for users of RDBMS systems.

This manual override approach exists in stark contrast to what automation users expect from modern RDBMS systems. One of the main advantages of RDBMS systems is that this type of work should be done automatically. The normal mode of operation is that the optimizer should automatically adjust execution plans given that the data distributions in the RDBMS system changes over time. If explicit overrides need to be specified, then this advantage of an RDBMS system is negated and the costly analysis may need to be repeated over and over again. Further, the option of manually overriding a system's optimizer is often not available to users. A growing part of RDBMS business supports "VAR" (Value-added Retailer) applications, including, for instance, those provided by Peoplesoft™, Siebel™, and Baan™. In these cases, the RDBMS users (i.e., end-user customers) may not even have the ability to use "force" options since only the VAR has the ability to change the application. At the same time, the VARs do not want to make RDBMS vendor specific changes to their application for problems in a particular RDBMS vendor's optimizer. All told, there exists great interest in improving an optimizer's plan selection without requiring users to provide explicit override options.

SUMMARY OF THE INVENTION

The present invention comprises a Client/Server Database System with improved methods for optimizing execution of database queries. In an exemplary embodiment, the system includes one or more Clients (e.g., Terminals or PCs) connected via a Network to a Server. The Server, operating under a server operating system (e.g., UNIX) includes a Database Server System, such as Sybase Adaptive Serverm. In general operation, Clients store data in and retrieve data from one or more database tables resident on the Server by submitting SQL commands, some of which specify "queries"—criteria for selecting particular records of a table.

For enhancing the speed in which the Database Server performs queries, the system provides methods employing spline histograms for improving the determination of selectivity estimates. The general approach improves histogram-based cost estimates as follows. The constant associated with a predicate (e.g., in r.a>5, the constant is "5") is used to do a binary search in an array of histogram boundary values, for determining a particular cell. Once a cell has been found, the system employs interpolation to find out how much of the cell has been selected. Once this interpolation value is found, it is used with a cell weighting and a spline value or weighting to estimate the selectivity of the predicate value. Here, the spline weighting takes into account how data values are distributed within the cell.

Internally, the system provides a "spline estimate" method, st_spline_estimate, which is invoked with three parameters: total, spline, and interpolate. The total parameter reflects the total weight of the selected histogram cell. The spline parameter indicates the positive or negative weighting of the spline. The interpolate parameter is the estimate of the portion of the cell selected, which is previously computed by an interpolate method.

The functionality of the "spline estimate" method is divided according to whether the spline is positive or negative. Selectivity is calculated in the case of a positive spline by adding the uniform component to the spline component. First, the uniform component of selectivity is determined by subtracting the spline value or weighting from the total cell weighting and then multiplying that quantity by the interpolate fraction, as follows.

selectivity=(total−spline)*interpolate;

Now, the method adds to the selectivity value the spline component, which is calculated as the spline weighting multiplied by the interpolate fraction squared.

selectivity+=spline*interpolate*interpolate;

In a similar manner, the calculation for a negative spline also adds the uniform component to the spline component. However in that instance, the uniform component of selectivity is calculated by subtracting the spline weight from the total cell weight and multiplying that value by the interpolate fraction.

selectivity=(total−spline)*interpolate;

To add the spline component, the method first calculates a new interpolate fraction by subtracting the previously-calculated interpolate fraction from the value of 1 as follows.

interpolate=1.0−interpolate;

Now, the selectivity calculation adds the spline component, which is determined by multiplying the spline value by the quantity of 1 minus the interpolate fraction squared, as follows.

selectivity +=spline*(1.0−interpolate*interpolate);

As a result of increased accuracy of estimates, the system can formulate better query plans and, thus, provide better performance.

A multi-attribute selectivity optimization methodology of the present invention is also described providing a more accurate estimate of the cost, so that the predicted performance of the final execution plan will be more accurate. In the single attribute case, histograms are used to capture selectivity of a single column but this cannot always accurately be combined to produce multi-attribute selectivities. In accordance with the present invention, the densities by how much the selectivity deviates from the single attribute density and by how much the multi-attribute densities differ from one another are used as a basis for multi-selectivity estimates. The multi-attribute densities are used to scale estimates between extremes of total independence and total dependence.

A method of the present invention for improving determination of cost estimates associated with data access occurring during execution of a database query may be summarized as follows. The system receives a database query specifying a database operation for at least one database object, where the database query specifies a query condition for selecting particular rows based on multiple attributes of at least one of the database objects. Now the method may proceed to determine an optimal execution path for executing the database query as follows. The method determines selectivity information providing a selectivity estimate for each of said multiple attributes; once this information has been determined, it may be stored persistently from one session to another, if desired. Next, the method determines correlation information that provides a measure of how well at least some of the multiple attributes are correlated; again, this may be stored in a persistent manner, if desired. Based on the determined correlation information, the method may selectively combine the selectivity information together for determining a multi-attribute selectivity estimate for the query condition. Now, this information may be employed to formulate a query execution plan for providing access to the database object(s), where the query execution plan includes an access strategy based on the determined multi-attribute selectivity estimate.

DEFINITIONS

For the discussion which follows, the following definitions are useful.

Density:
A measure of the average number of duplicates per value in a column of a table.

Selectivity:
A measure of the fraction of rows which satisfy a particular condition in a table SARGS
Scan arguments or predicates that are simple enough to be expressed in the form:

colid operator value where colid (column ID) specifies a particular column on which qualification condition needs to be applied. Here, operator is one of LT (less than), GT (greater than), EQ (equal to), NE (not equal to), LE (less than or equal to), GE (greater than or equal to), and value is a constant of the same data type as the column referred to by colid. For instance, salary<50K is a SARG but not (salary*3<50K).

DETAILED DESCRIPTION OF A PREFERRED EMBODIMENT

The following description will focus on the presently-preferred embodiment of the present invention, which is operative in a network environment executing client/server database applications. The present invention, however, is not limited to any particular application or environment. Instead, those skilled in the art will find that the present invention may be advantageously applied to any application or environment where optimization of query performance is desirable, including non-SQL database management systems and the like. The description of the exemplary embodiments which follows is, therefore, for the purpose of illustration and not limitation.

Standalone System Hardware

Figure 1A:
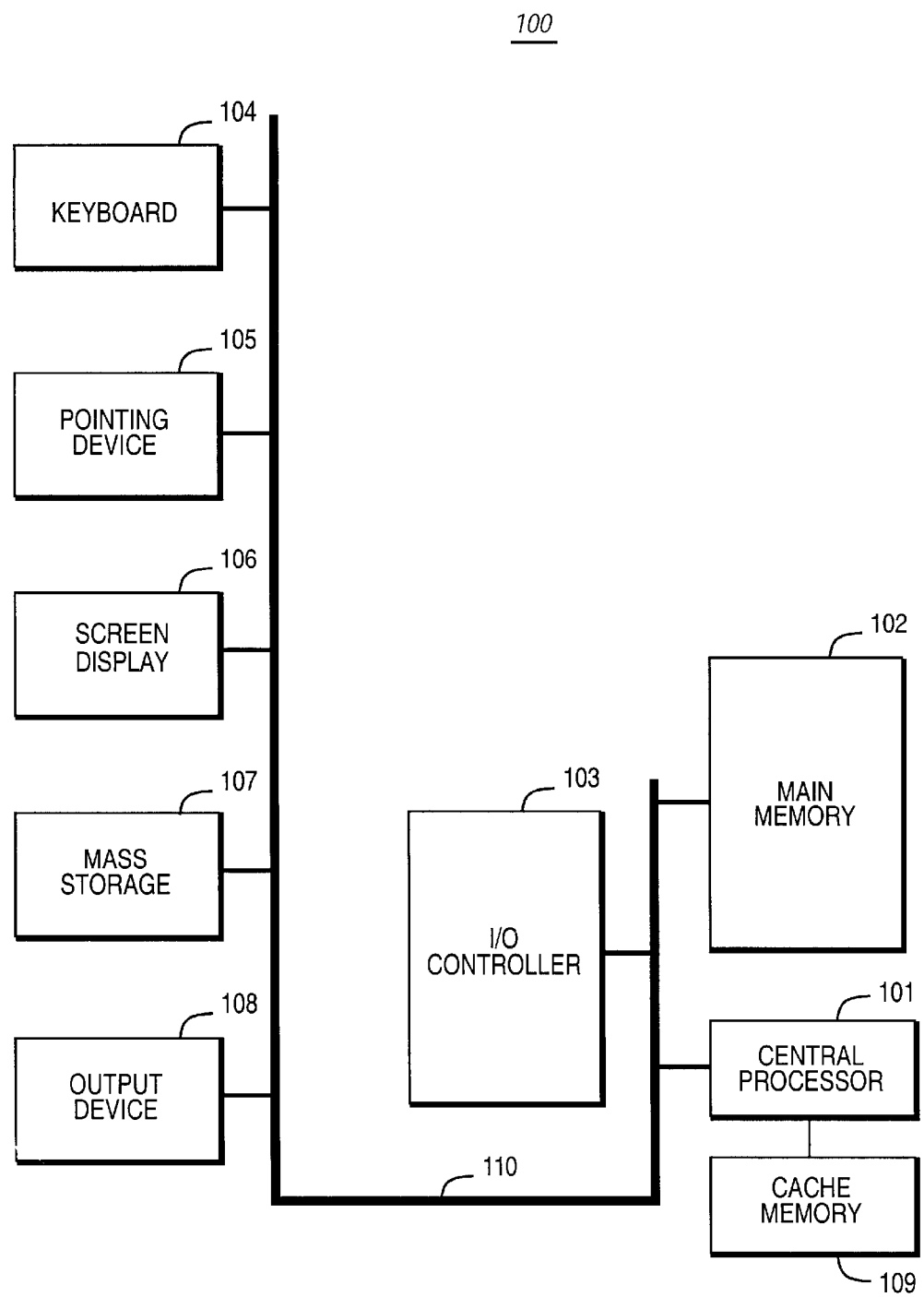
FIG. 1A is a block diagram illustrating a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, removable disk, optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an MM-compatible personal computer system, available from a variety of vendors (including IBM of Armonk, NY).

Standalone System Software

Figure 1B:
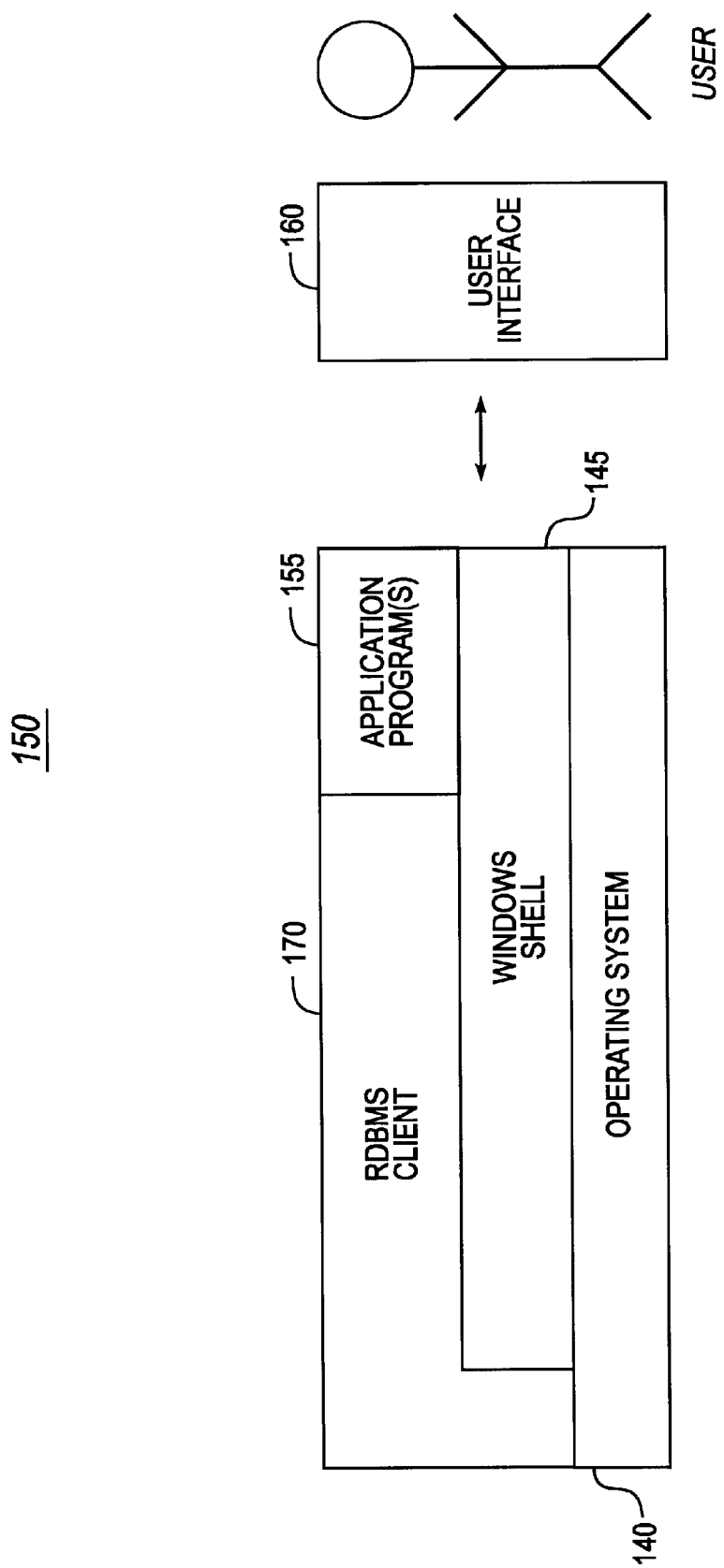
FIG. 1B is a block diagram illustrating a software subsystem for controlling the operation of the computer system of FIG. 1A.

Illustrated in FIG. 1B, a computer software system 150 is provided for directing the operation of the computer system 100. Software system 150, which is stored in system memory 102 and on mass storage or disk memory 107, includes a kernel or operating system (OS) 140 and a windows shell 145. One or more application programs, such as application software 155, may be "loaded" (i.e., transferred from storage 107 into memory 102) for execution by the system 100. The system also includes a user interface 160 for receiving user commands and data as input and displaying result data as output.

Also shown, the software system 150 includes a Relational Database Management System (RDBMS) front-end or "client" 170. The RDBMS client 170 may be any one of a number of database front-ends, including PowerBuilder™, dBASE®, Paradox®, Microsoft® Access, or the like. In an exemplary embodiment, the front-end will include SQL access drivers (e.g., Borland SQL Links, Microsoft ODBC drivers, Intersolve ODBC drivers, and the like) for accessing SQL database server tables in a Client/Server environment.

Client/Server Database Management System

Figure 2:
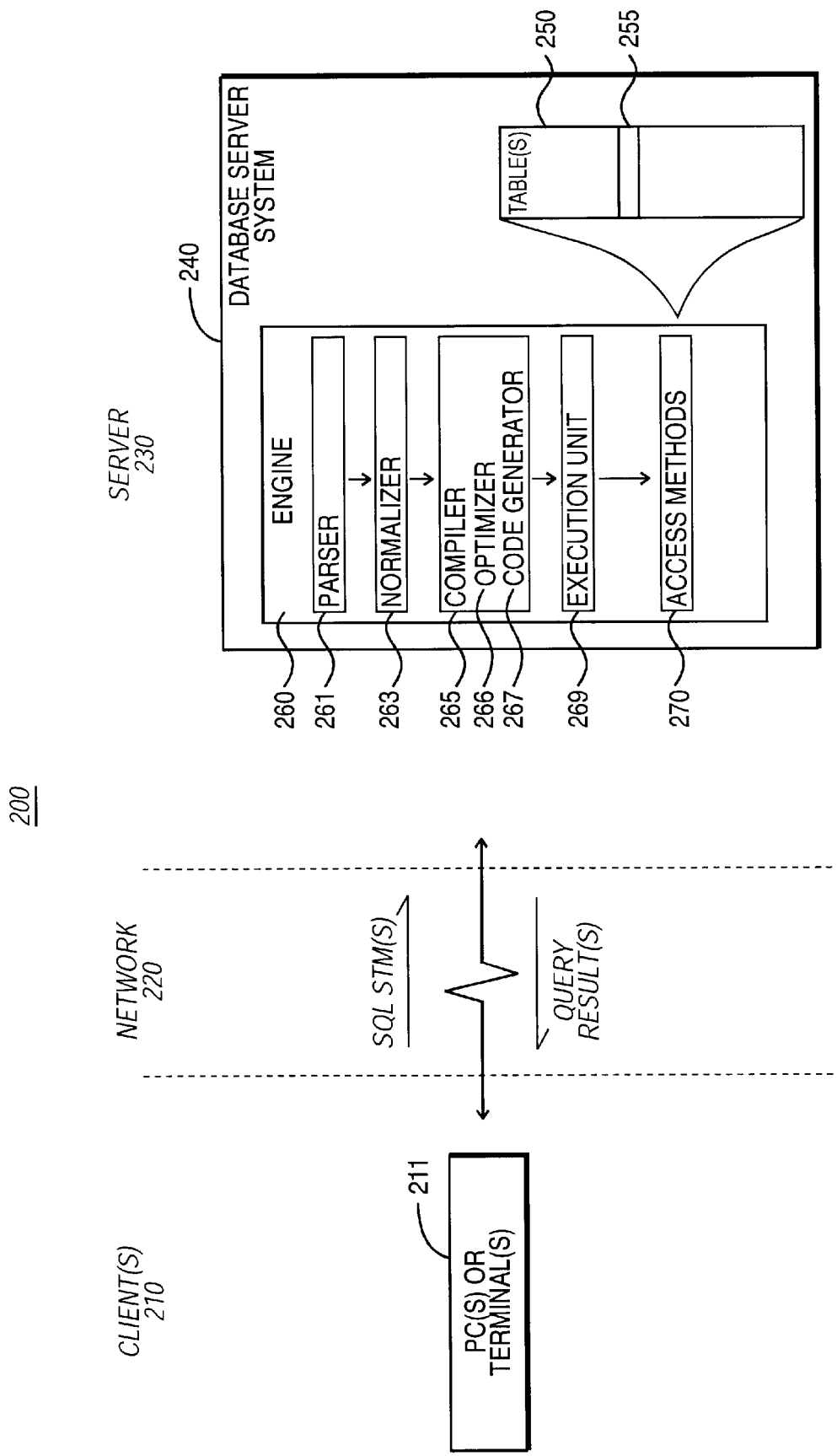
FIG. 2 is a block diagram of a client/server system in which the present invention is preferably embodied.

While the present invention may operate within a single (standalone) A computer (e.g., system 100 of FIG. 1A), the present invention is preferably embodied in a multi-user computer system, such as a Client/Server system. FIG. 2 illustrates the general structure of a Client/Server Database System 200 suitable for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240, which comprises Sybase Adaptive Server™ (available from Sybase, Inc. of Emeryville, Calif.) in an exemplary embodiment, generally operates as an independent process (i.e., independently of the clients), running under a server operating system such as Microsoft Windows NT (Microsoft Corp. of Redmond, Wash.), NetWare (Novell of Provo, UT), or UNIX (Novell). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client calls in the well-known SQL (Structured Query Language) together with any parameter information into a format (of one or more packets) suitable for transmission across a cable or wire, for delivery to the Database Server 240.

Client/server environments, database servers, and networks are well documented in the technical, trade, and patent literature. For a discussion of database servers and client/server environments generally and Adaptive Server™ particularly, see, e.g., Nath, A., *The Guide to SQL Server*, Second Edition, Addison-Wesley Publishing Company, 1995. Additional documentation of Adaptive Server™ is available from Sybase, Inc. as SQL *Server Documentation Set*. For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. application Ser. No. PCT/US90/04570, Intl. Publication No. WO 91/03024, Intl. Publication Date Mar. 7, 1991. For a general introduction to a Local Area Network operating under NetWare, see Freed, L. et al., PC *Magazine Guide to Using NetWare*, Ziff-Davis Press, 1991. A more detailed discussion is available in NetWare 3.x and 4.x and accompanying documentation, which is available from Novell of Provo, UT. The disclosures of each of the foregoing are hereby incorporated by reference.

In operation, the Client(s) 210 store data in or retrieve data from one or more database tables 250, shown in FIG. 2. Typically resident on the Server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the Clients issue one or more SQL commands to the Server. SQL commands may specify, for instance, a query for retrieving particular data (i.e., data records meeting the query condition) from the table 250. The syntax of SQL (Structured Query Language) is well documented; see, e.g., the abovementioned *An Introduction to Database Systems*. In addition to retrieving the data from Database Server tables, the Clients also include the ability to insert new rows of data records into the table; Clients can also modify and/or delete existing records in the table.

For enhancing the speed in which the Database Server stores, retrieves, and presents particular data records, the Server maintains one or more database indexes on the table. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file.

In operation, the SQL statements received from the one or more Clients 210 (via network 220) are processed by Engine 260 of the Database Server System 240. The Engine 260 itself comprises a Parser 261, Normalizer 263, Compiler 265, Execution Unit 269, and Access Methods 270. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

The query tree is normalized by the Normalizer 263. Normalization includes, for example, the elimination of redundant data. Additionally, the Normalizer performs error checking, such as confirming that table names and column names which appear in the query are valid (e.g., are available and belong together). Finally, the Normalizer can also look up any referential integrity constraints which exist and add those to the query.

After normalization, the query tree is passed to the Compiler 265, which includes an Optimizer 266 and a Code Generator 267. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes are available). The Optimizer, therefore, performs an analysis of the query and picks the best execution plan, which in turn results in particular ones of the Access Methods being invoked during query execution.

The Code Generator, on the other hand, converts the query tree into a set of instructions suitable for satisfying the query. These instructions are passed to the Execution Unit 269. Operating under the control of these instructions, the Execution Unit 269 generates calls into lower-level routines, such as the Access Methods 270, for retrieving relevant information (e.g., row 255) from the database table 250. After the plan has been executed by the Execution Unit, the Server returns a query result or answer table back to the Client(s).

Of particular interest to the present invention is enhancing operation of the system's optimizer for improving query execution. Modification of the Engine 260 for effecting this improvement will now be described in further detail.

Improving Query Performance by Implementing a Spline Histogram-Based Optimizer

A. Improving Cost Estimates

1. "Normal" Histogram

Figure 3:
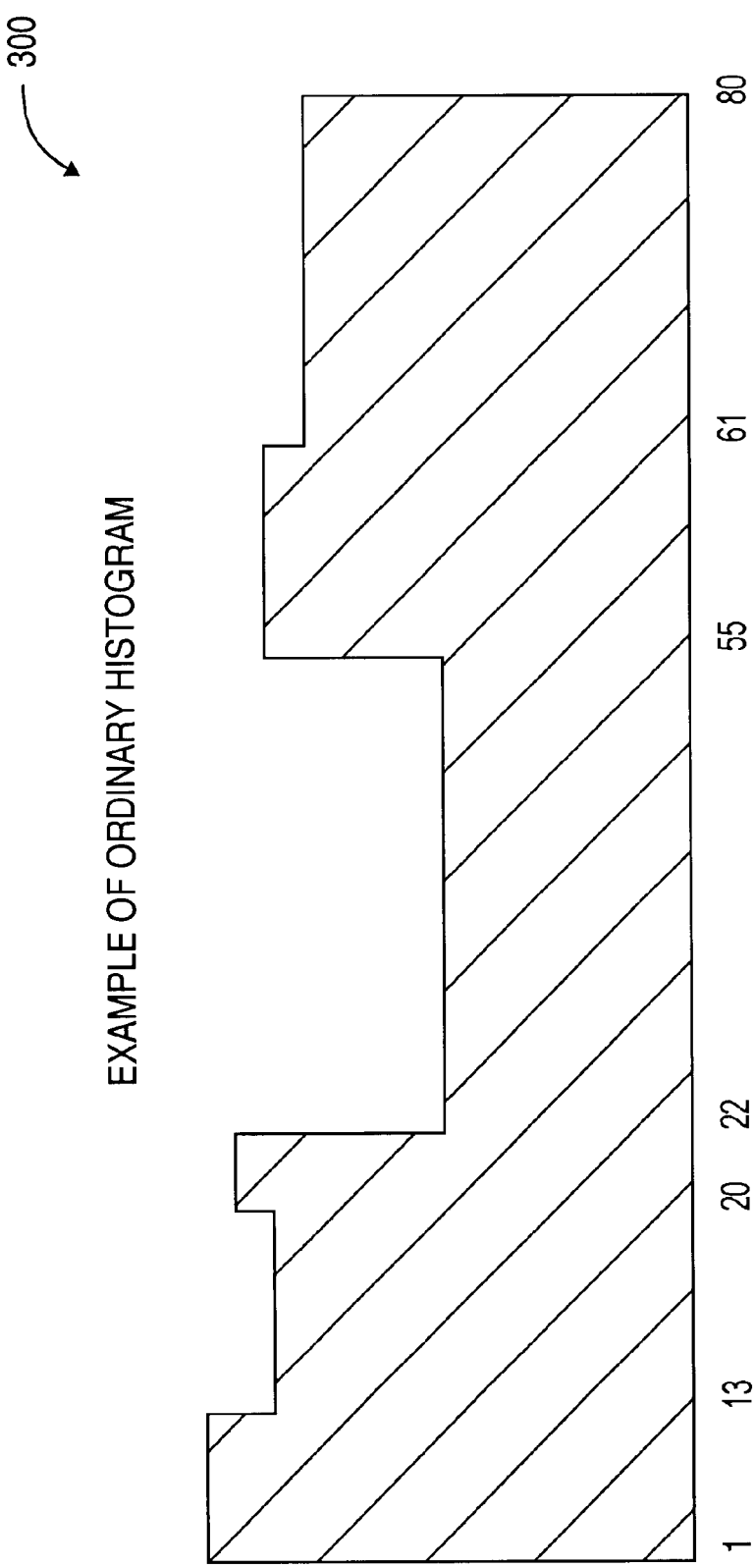
FIG. 3 illustrates an ordinary histogram having values which form specific cell boundaries.

Histograms have been used by most RDBMS vendors to do selectivity estimates, which eventually lead to cost estimates. A histogram is a set of "cells" defined by a lower bound and an upper bound, with an associated weight. Histogram chart 300, shown in FIG. 3, is an example of an ordinary histogram having values which form specific cell boundaries (i.e., rectangles defined by 1, 13, 20, 22, 55, 61, and 80). The size of each rectangle represents the proportion of tuples associated with a cell. This is perhaps best explained by example. Suppose a selectivity estimate is made for the following query, in which the above histogram 300 exists for the attribute "r.b".

select r.a from r where r.b<=23 and r.b>22

Based on the histogram, the optimizer would determine that the number "23" falls within the fourth cell and that the number "22" falls on the lower cellboundary of the fourth cell. Therefore, the selectivity of the where clause includes some fraction of the fourth cell.

A particular problem exists. In particular, the foregoing approach to formulating an estimate assumes that there is uniform distribution of tuples within a given cell. In this example, for instance, such an approach assumes that there are just as many records or tuples having a value of "23" as there are ones having a value of "54" (or other number within the cell). Thus, a proportion of the weight of a cell is estimated based on the uniform distribution assumption. This problem stems from the fact that normal histogram cells only have a single weight associated with each cell to describe that respective cell.

2. "Spline" Histogram

Figure 4:
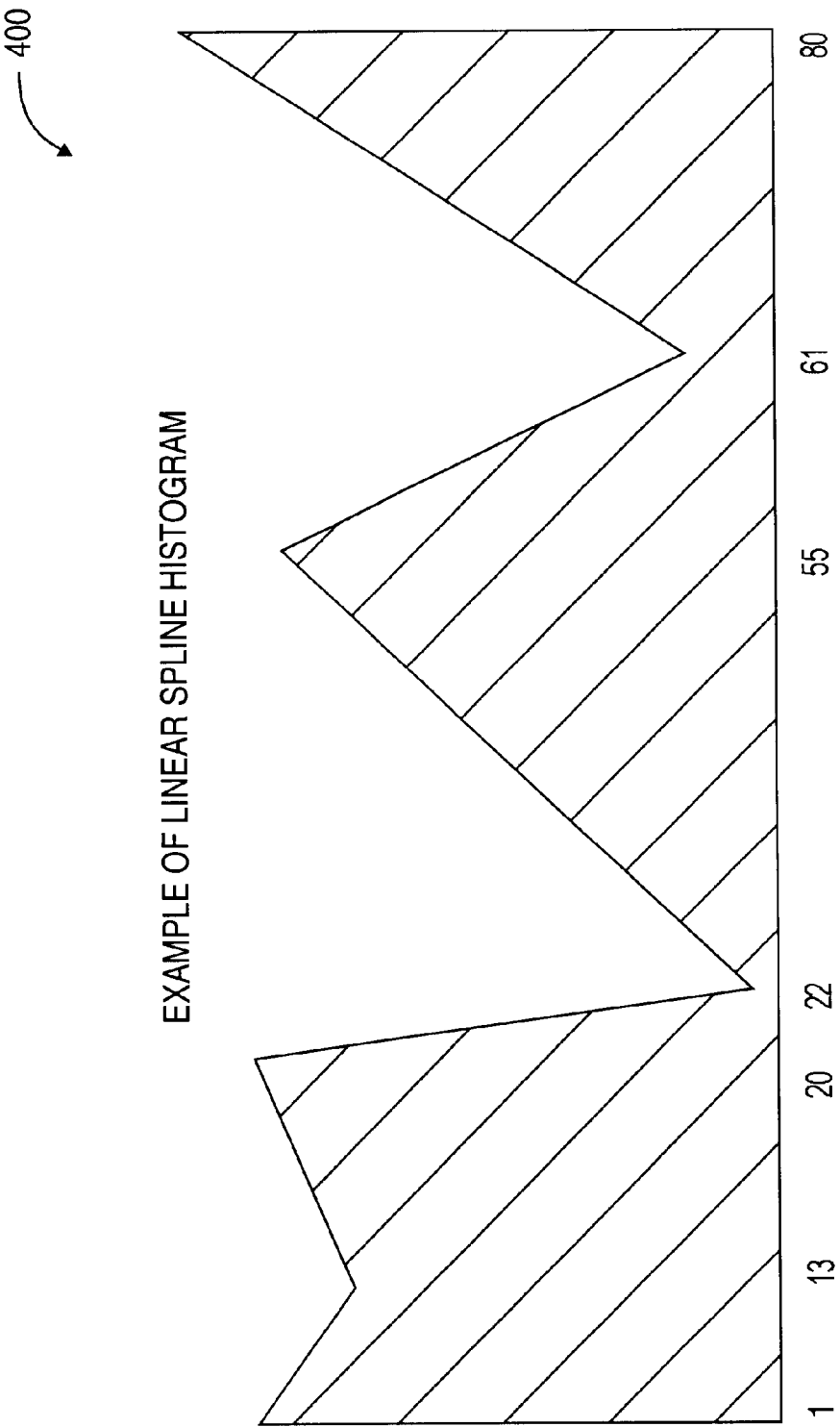
FIG. 4 illustrates a "spline" histogram for more accurately modeling the data set of FIG. 3.

Suppose that the real distribution for the underlying data set is closer to the distribution shown by linear spline histogram chart 400 of FIG. 4. The linear spline histogram 400 is an ordered set of values with floats, much like that of an ordinary histogram, except an extra float is associated with each cell for providing a measure of the linear spline. A "spline" is a measure of the portion of the cell which should be considered non-uniform when trying to interpolate the selectivity of a "range sarg." If a cell has a spline value of zero, then values within the cell are uniformly distributed. If a cell has a spline value greater than zero (i.e., positive spline), then values within the cell are distributed more densely near the end of the cell. If a cell has a spline value less than zero (i.e., negative spline), then values within the cell are distributed more densely near the beginning of the cell. Thus, the addition of a spline value—an extra floating-point value per cell—allows a more accurate selectivity estimate, because the actual distribution of the data within each cell can be more accurately modeled.

Returning to the prior example of "r.a>22 and r.a<=23", the smaller area selected in the linear spline histogram is a more accurate reflection of distribution than the area which would be selected had an ordinary histogram been employed. For the present example, the estimate for the normal histogram is incorrect by two orders of magnitude (i.e., 100 fold). A system whose optimizer employs the normal histogram, based on the incorrect estimation of distribution, runs the risk of selecting a poor query plan. The optimizer might, for instance, select an incorrect index or formulate an incorrect row estimate (affecting the join order). Since the query plan directly affects the response time of the RDBMS system, selection of a poor query plan leads to significantly slower system performance.

3. Storage of a Polynomial's Area

Extending this concept, an additional floating-point value per cell may be employed to model a quadratic approximation. In fact, any degree, n, of a polynomial can be modeled if n floats are added per cell. In accordance with the present invention, the preferred approach is implemented in a modular fashion so that any level of accuracy can be obtained by building on the existence of the previous degree. This is done by storing, in the respective floating point member, the area contributed by each term of the respective term of the polynomial, as opposed to defining the coefficients of the polynomial. Further, the preferred approach is built on top of the basic concept of a histogram, as opposed to trying to model the entire distribution of data by a more complex single polynomial or probability distribution (which is much more difficult to compute and would require a much higher degree to get an equivalent accuracy result). Thus, a normal histogram can be used for most of the cells. Only in those instances when the data distribution in some cells becomes skewed, do cells need to have spline components added.

4. Use of Interpolation

In accordance with the invention, interpolation methodology is employed to estimate the proportion of a histogram cell selected. Note that histograms can be applied to any data type—including integer, float, character string, date/time, money, and the like—with interpolation measuring how much of a cell is selected by the constant. As will be seen, the percentage of this selection of the cell is employed in order to use the percentage as part of the spline histogram formula.

B. Preferred Spline Histogram Methodology

1. Introduction

As previously described, the normal histogram has an assumption that values are uniformly distributed within the range of the lower and upper bound of a cell. Conventionally, optimizers determine the proportion of a cell that is selected using the uniform distribution assumption, and then take the appropriate fraction of the total selectivity of a cell. Consider, for example, a cell characterized as follows.

10<0.20 table rows<=20

The above cell indicates that 20% of the values are uniformly distributed between 10 and 20. Thus, if a sarg such as r.a>16 were to be estimated, since 40% of the cell is selected (i.e., (20−16)/(20−10)=40%), the selectivity for the sarg would be 20%*40%=8%. However, in many cases the distribution is not linear and can be represented more accurately by a piece-wise linear curve fitting algorithm. The alternative to this is to try to compensate by increasing the number of cells employed (i.e., increase the sampling) in an effort to reduce the error in the estimates. Given concomitant memory and processor requirements, however, the approach is not practical.

Figure 5:
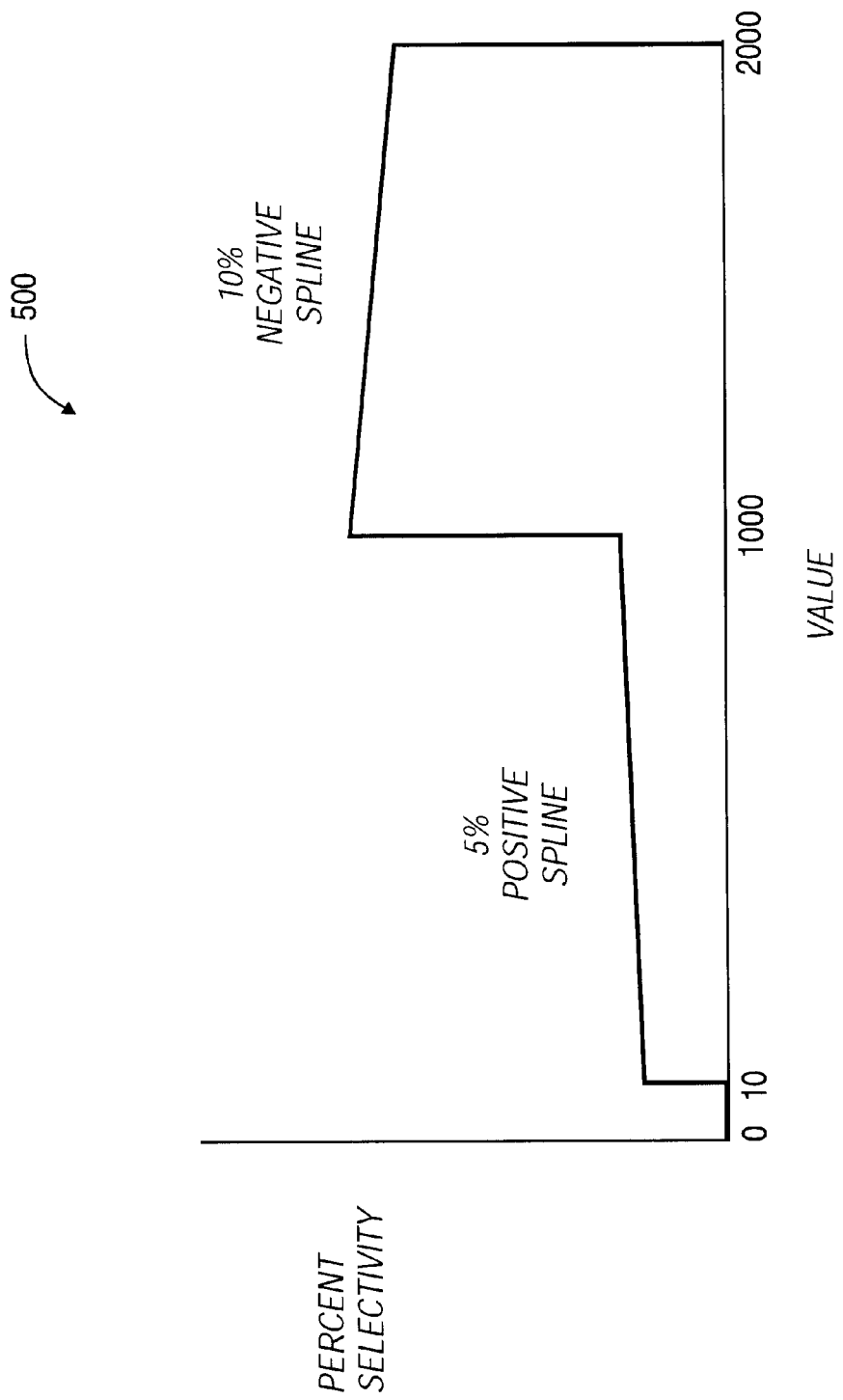
FIG. 5 illustrates how a histogram having three cells is represented internally within the system.

The preferred solution, therefore, is a spline histogram employing not one but two floating-point components, for reflecting the total selectivity of the cell as well as the portion of the cell which is non-uniform. Consider a histogram having three cells, such as histogram 500 shown in FIG. 5. In accordance with the present invention, the histogram (illustrated in exaggerated scale) can be represented by the following list.

| Step no | weight | boundary value | Linear Spline |
|---------|--------|----------------|---------------|
| 1 | 0.0 | 10 | 0.0 |
| 2 | 0.20 | 1000 | 0.05 |
| 3 | 0.80 | 2000 | −0.10 |

The above spline histogram list has components for two cells in which the first one has values between 10 and 1000 which select 20% of the relation and has a positive spline of 5%. The second cell selects 80% of the relation and has a negative spline of −10%. The histogram can be represented in a database by storing values for characterizing each histogram cell. In an exemplary embodiment employing Sybase® Adaptive Server™, for instance, the information can be stored as three records in the system statistics (SYSSTATISTICS.) table. If desired, the linear spline components can be stored as a separate record.

2. Detailed Methodology

Spline-based histograms are useful for modeling data distributions which are typically not uniform within a cell. In cases in which data is totally uniform within a cell, only two step values are required for the distribution, since an interpolation algorithm may be employed to obtain an accurate estimate based on the assumption of uniform distribution. In cases in which the distribution is not uniform, however, there typically is a gradual increase or decrease in the "spacing" of data within the column. In such instances, spline histograms may reduce the "number of steps required," for instance, by an order of magnitude (e.g., from 100 or 200 to 20).

Figure 6:
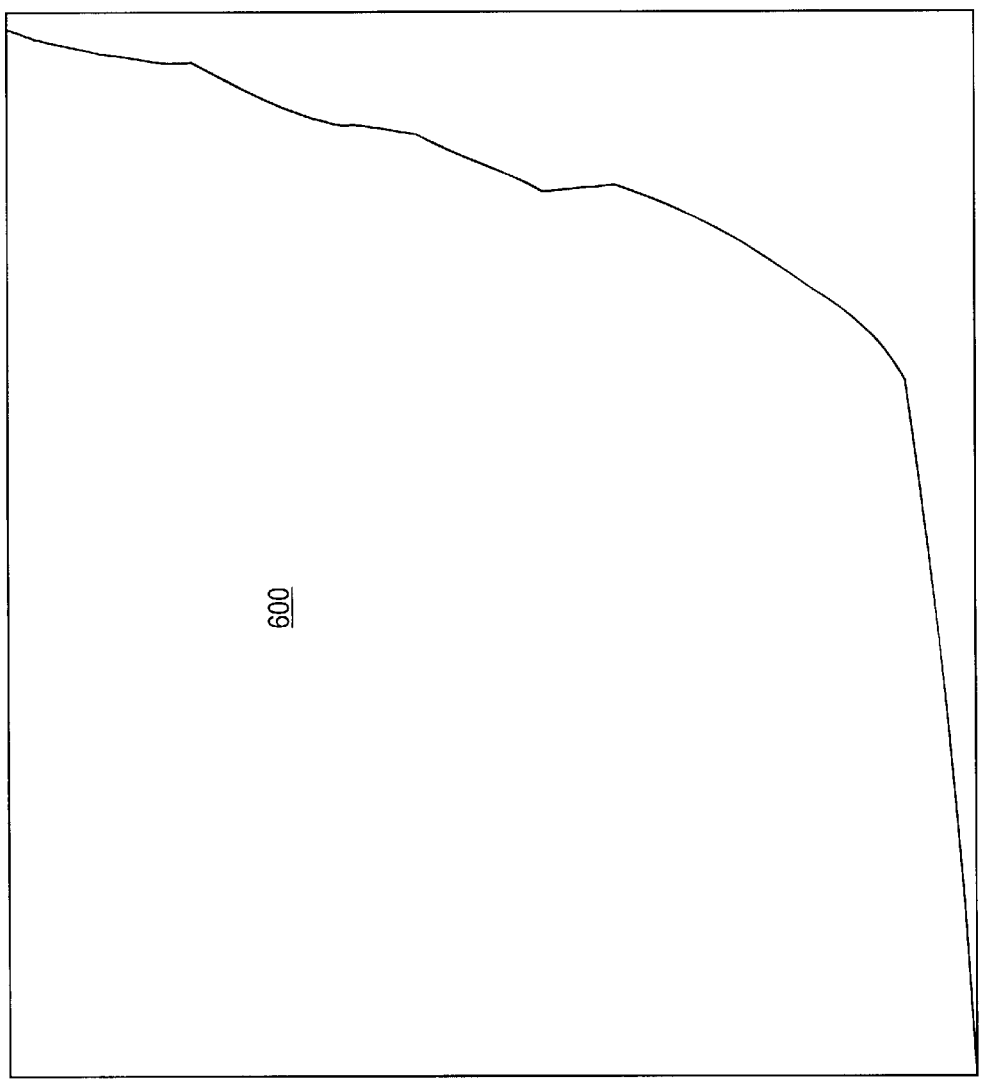
FIG. 6 is a diagram illustrating a histogram cell having a non-uniform distribution of values within the cell, thus leading to inaccurate estimates in systems which assume a uniform distribution of values within each cell.

As previously described, a particular disadvantage of increasing the number of cells to reduce estimation errors is the concomitant dramatic increase in system resources—the amount of disk space, memory resources, and processing—which are required when spline histograms are not employed. Suppose, for example, that data for a particular step 600 is distributed as shown in FIG. 6. Clearly in such a case the assumption of uniform distribution is not accurate: any "<" estimate would probably be too high and any ">" estimate would probably be too low. Here, it would likely be more accurate to estimate this cell with a "positive spline" in which more values are near the end of the cell rather than the beginning. An extremely accurate estimate of a data distribution with fewer steps than a normal histogram can be obtained by applying the methodology of the present invention.

Figure 7:
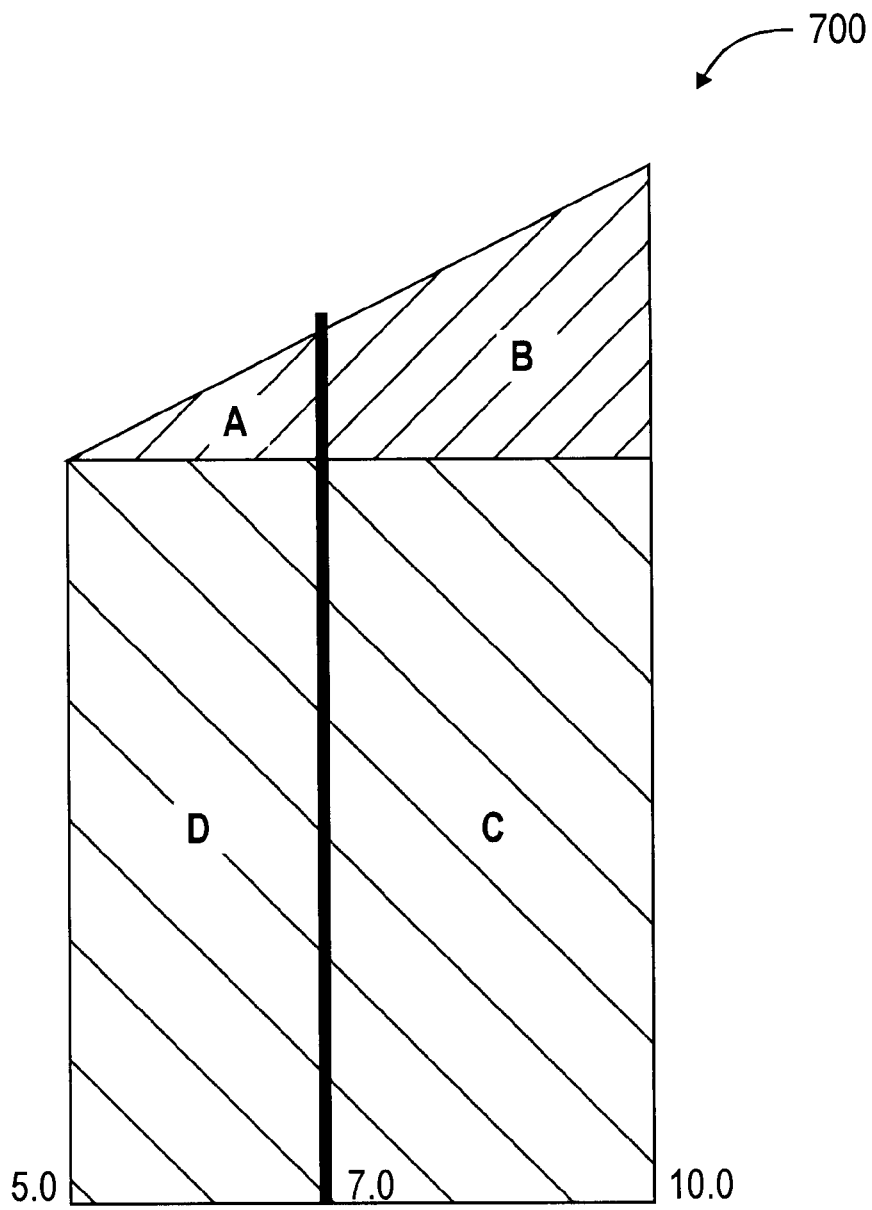
FIG. 7 is a diagram illustrating a histogram cell having a non-uniform distribution of values within the cell which can be accurately modeled by use of a spline component.

Suppose, as another example, that data is distributed within a step 700 as shown in FIG. 7. The figure represents a linear spline for a step with boundary values 5.0 to 10.0. If a normal histogram were employed (i.e., uniform assumption), the sum of the areas of A+B+C+D would be represented by the float between the boundaries of 5.0, 10.0, with the result that the selectivity of the search argument r.a<7.0 would be overestimated. The spline component of the step 700 is represented by the sum of areas of A+B; the uniform component of the above diagram is represented by the sum of areas of C+D. Thus, the absolute value of the spline component added to the uniform component equals the normal histogram component:

ABS (spline component)+uniform component=normal histogram component

Suppose that the sum of the areas of A, B, C, and D are 0.20 (i.e., A+B+C+D=0.20), which is the float stored in a normal histogram. Suppose also that the sum of the areas of A and B are 0.05 (A+B=0.05), which is the float stored in a spline array. Using interpolation, the estimate of "r.a<7" for this cell is (7−5)/(10−5)=0.40. If the spline component were not available, then the estimate for the selectivity of the range search argument in this cell would be 0.08 (calculated as 0.40*0.20=0.08). If the spline is considered then the estimate becomes 0.40 (calculated from (0.40**2)*0.05+(0.20−0.05)*0.40). From calculus, one can determine or integrate the area as a triangle proportional to the square of the x-axis coordinate. In this case, the selectivity of 0.40 is squared to get "area of triangle A." Since everything is proportional, the total area of "A+B=0.05" can be multiplied to get the selectivity of triangle A. The second term is derived by removing the spline component from the total selectivity of the cell, that is (0.20−0.05), to get the uniform component; a uniform distribution is assumed on this remaining component, that is (0.20−0.05)*0.40.

In order to avoid an extra multiplication step, the computation can be factored to be 0.40*(0.40*0.05+0.20−0.05)= 0.068. The selectivity within a step is, therefore, computationally very simple. Intuitively, if the spline component is large (A+B), then the uniform component (C+D) is small and, thus, would represent a steeper slope in the graph. If the spline component were close to zero, the behavior would be that of a uniform distribution. A spline component which is negative can be represented by a negative sloped line. Note that the histogram cell (i.e., sum of the areas A+B+C+D) always includes the spline component so that the uniform component of a cell (i.e., sum of the areas C+D) is calculated by removing the spline component ((A+B+C+D)−(A+B)). This simplifies the computation by allowing a trivial computation for the total range selectivity: sum all the steps which fall below the selected step in which "r.a<7" fell. Here, only one spline value is used in the selectivity computation per sarg, and this is only used if the sarg constant falls between steps.

3. Source code implementation a. Overview

Methods are provided for determining the selectivity estimate for a histogram. The general approach improves histogram-based cost estimates as follows. The constant associated with a predicate (e.g., in r.a>5, the constant is "5") is used to do a binary search in the array of histogram boundary values, for determining a particular cell. Once a cell has been found, the system employs interpolation to find out how much of the cell has been selected. Once this interpolation value is found, it is used with a cell weighting and a spline value or weighting—which takes into account how data values are distributed within the cell—to estimate the selectivity of the predicate value.

b. Data Structures

At the outset, it is helpful to review core data structures employed when implementing the methodology of the present invention. A first data structure, statistics_rp, is used to read statistics from and write statistics to disk. It may be defined as follows (using the C programming language).

```
/* structure associated with SYSSTATISTICS tuple used to read/write
statistics from disk */
typedef struct statistics_rp
{
    /* row locked table format */
    uint16 st_crno;        /* row number */
    uint16 st_statbyte;    /* status field */
    uint16 st_eightyone;   /* 81 variable length fields */
    B1MBDEF (SLID, b1senscol)  /* B1 only: sensitivity label */
    B1MBDEF (SLID, b1infocol)  /* B1 only: information label */
    statid_t    st_statid;      /* future expansion */
    objid_t     st_tabid;       /* statistics on this table id */
    sequence_t  st_seqno;       /* sequence number for record */
    DATE        st_moddate;     /* date of last modification */
    formatid_t  st_formatid;    /* formatid of stats record */
```

-continued

```
    BYTE      st_usedcount;  /* number of valid varbinary
                              ** entries in tuple
                              */
/* beginning of VARBINARY data */
    int16     st_len;                   /* length of row */
    BYTE      st_colidarray[MAXKEY];    /* array of colids associated
                                        ** with stats record
                                        */
    union stf_u
    {
        /* - this structure defines the various formats which
        ** can be found in a SYSSTATISTICS row
        ** - fmtrow will understand how to decode the FMT10_COLSTAT
        ** FMT20_SYSTABSTATS and FMT30_PARTITIONS
        ** - FMT11_BOUNDARY and FMT12_WEIGHTS will use the
        ** ptrfmtrow( ) API to fmtrow
        */
        double             st_align;       /* align st_histsteps */
        FMT10_COLSTAT      st_colstat;     /* column statistics descriptor
*/
        FMT11_BOUNDARY     st_histsteps;   /* histogram boundary values */
        FMT12_WEIGHTS      st_weights;     /* histogram weights */
        FMT12_WEIGHTS      st_splines;     /* spline values */
        FMT20_SYSTABSTATS  st_systabstats; /* systabstats snapshot */
        FMT30_PARTITIONS   st_partitions;  /* partition information */
    }stf;
}STATISTICS_RP;
where FMT12_WEIGHTS is defined as follows.
/* FORMATID 12 - array of weights used for uniform weight component and any
spline component */
typedef struct fmt12_weights
{
    weight_t   st_weightarray[MAXSTATVARBINARY];
}FMT12_WEIGHTS;
```

Of interest to the present invention is an array of weights associated with the ordinary histogram and an array of weights which are the spline weights. Use of these values is illustrated later.

Once the foregoing information (including the spline weights) is read from disk, it is stored in in-memory structures used for manipulation. In particular, these structures are optimized for run-time, in-memory use. A "virtual array", which is employed for storing weights/splines, is defined as follows.

```
*VIRTUAL array - organized as a linked list of array fragments which
** are accessed via a virtual array API, used for weights/splines to
** create a virtual array of values
*/
typedef struct st_virtual
{
    struct st_virtual  *st_nextvirtual; /* if list of st_values is
                                        ** too large to fit into a page
                                        ** then go to next page
                                        */
    BYTE               *st_values; /* this will be coerced to an
                                   ** array of values, or an array
                                   ** of pointers
                                   */
}ST_VIRTUAL;
```

A description of the histogram itself, histogram statistics, may be defined as the following data structure.

```
/* HISTOGRAM STATISTICS
*/
typedef struct st_histogram
```

-continued

```
{
    stepct_t   st_requestedstepct; /* number of weights requested */
    stepct_t   st_actualstepct;    /* number of weights */
    int32      st_status; /* set of booleans */
#define STHT_PTR  0x00000001L   /* is histogram datatype a PTR */
    ST_STEPS     st_steps;    /* ptr to list of step structs */
    ST_VIRTUAL  *st_weights;  /* ptr to list of weights associated
                              ** with st_steps
                              */
    ST_VIRTUAL  *st_splines;  /* if non-NULL then a ptr to the
                              ** spline component associated with
                              ** the st_weightp
                              */
}ST_HISTOGRAM;
```

The "requested step count," st_requestedstepct, stores the number of steps (and therefore weights) that the user requested for creating the histogram. The "actual step count," st_actualstepct, stores the actual number used. In the currently-preferred embodiment, the system has a default value of 20, which the user can override on a per table basis. The next data member, st_steps, is a pointer to a list of step structures; this is effectively a virtual array of boundary values. The st_weights data member provides a virtual array of weights (for the ordinary histogram case). Finally, st_splines provides a virtual array of spline weights. With an understanding of these data structures, the internal method steps employed by the currently-preferred embodiment may now be examined.

c. Internal Methods

To determine the percentage of a step selected by a qualification (e.g., query predicate), the system employs an "interpolate" method, STU_INTERPOLATE. The method may be constructed as follows.

```
/*
**  STU_INTERPOLATE
**
**  Purpose:
**      Determine the percentage of a step selected by a qualification.
**      Assumption is that lowerp <= valuep <= upperp. The fraction
determined
**      is logically (valuep - lowerp) / ( upper - lowerp).
**
**  Parameters:
**      datatypep -    ptr to datatye structure of values
**      lowerlen -         length of lower bound value
**      lowerp -           ptr to lower bound value
**      valuelen -     length of value to interpolate
**      valuep -           ptr to value to interpolate
**      upperlen -     length of upper bound value
**      upperp -           ptr to upper bound value
**      charstatp -    ptr to structure of statistical analysis
**                     of character positions
**
**  Returns
**      0.0 <= value <= 1.0 which represents the percentage
**          selected by a qualification
**
*/
percent_t
stu_interpolate(
        ST_DATAVALUE        *lb_dvp,
        ST_DATAVALUE        *mid_dvp,
        ST_DATAVALUE        *ub_dvp,
        ST_CHARSTAT     *charstatp,
        SYB_BOOLEAN     *estimatep)
{
        length_t            lower len;
        BYTE        *lowerp;
        length_t            valuelen;
        BYTE        *valuep;
        length_t            upperlen;
        BYTE        *upperp;
        percent_t           width;          /* estimate of width of cell */
        percent_t f         raction;    / * fraction of cell selected */
        double              ldouble;
        double              vdouble;
        double              udouble;
        datatype_t          left_dt;
        datatype_t          right_dt;
        *estimatep = TRUE;
        lowerlen = lb_dvp—>st_vallen;
        lowerp = lb_dvp—>st_valuep;
        valuelen = mid_dvp—>st_vallen;
        valuep = mid_dvp—>st_valuep;
        upperlen = ub_dvp—>st_vallen;
        upperp = ub_dvp—>st_valuep;
        SYB_ASSERT(lowerlen && upperlen);
        if (!valuelen)
        {
            fraction = 0.0;
        }
        else
        {
            /* assert that datatype are compatible */
            SYB_ASSERT( (  (left_dt = stu_n_datatype(&lb_dvp—>st_dt) ) ==
                           (right_dt = stu_n_datatype(&mid_dvp—>st_dt) ) ||
                           (left_dt == NUME && right_dt == DECML) ||
                           (left_dt == DECML && right_dt == NUME)
                           )
                &&
                            ((left_dt = stu_n_datatype(&lb_dvp—>st_dt) ) ==
                           (right_dt = stu_n_datatype(&ub_dvp—>st_dt) ) ||
                           (left_dt == NUME && right_dt == DECML) ||
                           (left_dt == DECML && right_dt == NUME)
                           )
                );
            SYB_ASSERT( (ISCHARTYPE(lb_dvp—>st_dt.st_datatype))
                            ||
                            (lb_dvp—>st_dt.st_datatype == DT_VARBINARY)
                            ||
                            (lb_dvp—>st_dt.st_datatype == DT_BINARY
                            ||
```

-continued

```
                    (    (lb_dvp—>st_dt.st_length ==
                          mid_dvp—>st_dt.st_length)
                         &&
                         (lb_dvp—>st_dt.st_length ==
                          ub_dvp—>st_dt.st_length ) )
                    );
    switch (stu_n_datatype(&lb_dvp—>st_dt))
    {
            case DT_INT4:
            {
                    width = (double) (*((int32 *)upperp)) −
                            (double) (*((int32 *)lowerp));
                    fraction = ((width <= 0.0) ? 1.0 :
                        ((double) (*((int32 *)valuep)) −
                         (double) (*((int32 *)lowerp)))
                            / width);
                    break;
            }
            case DT_INT2:
            {
                    width = (int) (*((int16 *)upperp)) −
                            (int) (*((int16 *)lowerp));
                    fraction = ((width <= 0.0) ? 1.0 :
                        ((int) (*((int16 *)valuep)) −
                         (int) (*((int16 *)lowerp)))
                            / width);
                    break;
            }
            case DT_INT1:
            {
                    width = (int) (*((unsigned char *)upperp)) −
                            (int) (*((unsigned char *)lowerp));
                    fraction = ((width <= 0.0) ? 1.0 :
                        ((int) (*((unsigned char *)valuep)) −
                         (int) (*((unsigned char *)lowerp)))
                            / width);
                    break;
            }
            case DT_FLT4:
            {
                    fraction = stu_doubleinter(*(float *)lowerp,
                                *(float *)valuep,
                                *(float *)upperp);
                    break;
            }
            case DT_FLT8:
            {
                    fraction = stu_doubleinter(*(double *)lowerp,
                                *(double *)valuep,
                                *(double *)upperp);
                    break;
            }
            case DT_CHAR:
            case DT_VARCHAR:
            {
                    fraction = stu_bincharinter(' ', charstatp,
                         lowerlen, lowerp,
                         valuelen, valuep,
                         upperlen, upperp);
                    break;
            }
            case DT_BINARY:
            case DT_VARBINARY:
            {
                    fraction = stu_bincharinter((char)0,
                            charstatp,
                            lowerlen, lowerp,
                            valuelen, valuep,
                            upperlen, upperp);
                    break;
            }
            case DT_SHORTMONEY:
            {
                    (void) stu_mny4toflt8(lowerp, &ldouble);
                    (void) stu_mny4toflt8(valuep, &vdouble);
                    (void) stu_mny4toflt8(upperp, &udouble);
                    fraction = stu_doubleinter(ldouble,
                                vdouble, udouble);
                    break;
```

```
                        }
                        case DT_MONEY:
                        {
                                (void) com_mnytoflt8 (lowerp, lowerlen, (BYTE
*)*ldouble,
                                    sizeof(double), 0);
                                (void) com_mnytoflt8(valuep, valuelen, (BYTE
*)&vdouble,
                                    sizeof(double), 0);
                                (void) com_mnytoflt8(upperp, upperlen, (BYTE
*)&udouble,
                                    sizeof(double), 0);
                                fraction = stu_doubleinter(ldouble,
                                        vdouble, udouble);
                                break;
                        }
                        case DT_DATETIME:
                        {
                                fraction = stu_dateinter((CS_DATETIME *)lowerp,
                                    (CS_DATETIME *)valuep,
                                    (CS_DATEIMTE *)upperp);
                                break;
                        }
                        case DT_SHORTDATE:
                        {
                                fraction = stu_shortdateinter(
                                        (CS_DATETIME4 *)lowerp,
                                        (CS_DATETIME4 *)valuep,
                                        (CS_DATETIME4 *)upperp);
                        }
                        case DECML:
                        case NUME:
                        {
                                *estimatep = stu_decimalinter(
                                    lb_dvp, mid_dvp, ub_dvp, &fraction);
                                break;
                        }
                        default:
                        {
                                /* return 50% if datatype not supported */
                                *estimatep = FALSE;
                                fraction = 0.5;
                                break;
                        }
                }
        }
        SYB_ASSERT((fraction >= 0.0) && (fraction <= 1.0));
        if (fraction < 0.0)
        {
                fraction = 0.0;
        }
        else if (fraction > 1.0)
        {
                fraction = 1.0;
        }
        return (fraction);
}
```

This method calculates the percentage of a cell selected. This method takes the step value which falls within the cell and then determines the percentage of the cell which has been selected. When the method is invoked, it is passed the lower bound of the cell, the upper bound of the cell, and the actual value (i.e., the predicate value). The parameters can reference any valid data type in the system, including an integer, float, character string, or the like. Based on the particular data type encountered, the method then switches to a particular handler (case arm) for appropriate processing of the data type. In the instance of a data type which is a 4-byte integer (DT_INT4), for instance, the method calculates the width of the cell by subtracting the lower bound value from that of the upper bound value. A fraction can then be calculated by the predicate value divided by the width. The fraction indicates that portion of the cell which is selected (between 0.0 and 1.0). The other case arms or branches function in a similar manner to calculate a fraction for the predicate value which is between 0.0 and 1.0. After ensuring that the calculated fraction is between the acceptable range of 0.0 and 1.0, the method returns the fraction value.

Given a histogram with boundary values and given a predicate value, the system employs a "histogram hit type" method, ST_HIST_HITTYPE, for determining which cell the predicate value falls within. The method may be constructed as follows.

```
/*
**      ST_HIST_HITTYPE
**
**  Calculate the step the sarg is associated with, or other relationship
**  with histogram if no step can be selected. Use binary search and
return
**  HIT_INTERPOLATE if interpolation should be subsequently used, along
with
**  spline histogram estimation. Spline histograms useful when a range
sarg
**  hits a cell with interpolation.
**
**      Parameters:
**          histp - ptr to descriptor of histogram for a column
**          optype - operator type =, !=, >, >=, <, <=, IS NULL
**              and IS NOT NULL
**          stepnop - step upon which the sarg constant hit
**          dvp - ptr to structure describing the data value
**
**      Returns:
**          hit_type - the way in which the sarg fell into the histogram
**              steps
**
**      Side Effects:
**          None
**
*/
SYB_STATIC hittype_t
st_hist_hittype(
        ST_HISTOGRAM        *histp,
        relop_t             optype,
        ST_DATAVALUE        *dvp,
        stepct_t            *stepnop)
{
        stepct_t            maxstep;    /* number of steps in the histogram */
        stepct_t            lowstep;
        stepct_t            highstep;
        stepct_t            midstep;
        stepct_t            frequency_step;
        ST_VIRTUAL          **virtualpp;
        SYB_BOOLEAN         onstep;
        SYB_BOOLEAN         isptr;
        ST_DATAVALUE        hist_dt;
        SYB_BOOLEAN         compare_result;
        percent_t           selectivity;
        hittype_t           hittype;
        length              cellwidth;
        if (!dvp—st_vallen)
        {
            return (HIT_NULL);
        }
        maxstep = histp—>st_actualstepct − 1;
        if (maxstep < 1)
        {
            /* only one step implies all values are NULL in the histogram
            ** so no rows are selected, since the dvp value is not NULL
            */
            return (HIT_NULLHISTOGRAM);
        }
        isptr = histp—>st_status & STHT_PTR != 0;
        virtualpp = &histp—>st_steps.st_boundary;
        STRUCTASSIGN (histp—>st_steps.st_dt, hist_dt.st_dt);
        hist_dt.st_vallen = hist_dt.st_dt.st_length;
        lowstep = 0;
        highstep = maxstep;
        midstep = maxstep/2;
        onstep = FALSE;
        cellwidth = (histp—>st_status & STHT_PTR) ?
            sizeof (BYTE *): hist_dt.st_dt.st_length;
        /* binary search to determine where constant falls in step array */
        while (lowstep < highstep)
        {
            hist_dt.st_valuep = stu_findslot((PROC_HDR *) NULL, virtualpp,
                                cellwidth, midstep, maxstep);
            if (isptr)
            {
                /* ptr to a ptr
                ** EARL_RESOLVE - assume character string for now
                */
```

-continued

```
            hist_dt.st_valuep = *(BYTE **)hist_dt.st_valuep;
            hist_dt.st_vallen = *(hist_dt.st_valuep++);
    }
    compare_result = stu_compare (&hist_dt, dvp);
    if (onstep)
    {
        /* a previous iteration found that the constant was
        ** on a step boundary so now the check is for a frequency
        ** count cell
        */
        if (!compare_result)
        {
            /* frequency count cell has been selected */
            if (midstep == highstep)
            {
                /* frequency_step needs to reference the
                ** higher step value of two equal step
                ** values
                */
                frequency_step = highstep;
            }
            *stepnop = frequency_step;
            return (HIT_FREQUENCY);
        }
        if (!frequency_step)
        {
            /* since the frequency step fell on the first
            ** boundary, and this first boundary is not a
            ** frequency count cell then by convention the
            ** constant is less than all values in the
            ** histrogram
            */
            return (HIT_UNDERFLOW);
        }
        if (midstep > frequency_step)
        {
            /* check to see if the lower step forms a
            ** a frequency count
            */
            midstep = frequency_step - 1;
            continue;
        }
        /* check if the next lower step is part of a dense
        ** sequence of frequency steps, making tis a
        ** frequency value otherwise . . .
        ** no adjacent steps form a frequency count so this
        ** is a case of a constant falling on the step
        ** boundary of a range cell
        */
        *stepnop = frequency_step;
        return (stu_dense_frequency(&hist_dt, dvp) ?
                HIT_FREQUENCY : HIT_RANGEFREQUENCY) ;
    }
    if (!compare_result)
    {
        if midstep == maxstep)
        {
            /* cannot be a frequency cell since only can
            ** occur if lowstep was tested as less than
            */
            *stepnop = midstep;
            return (HIT_RANGEFREQUENCY);
        }
        /* constant value is on a step boundary so check for
        ** a frequency count cell
        */
        onstep = TRUE;
        frequency_step = midstep;
        if (!midstep)
        {
            highstep = 1;
            midstep = 1;
        }
        else
        {
            highstep = ++midstep;
        }
        continue;
    }
```

```
        else if (compare_result > 0)
        {
            if (lowstep == midstep)
            {
                /* no change since last comparison */
                SYB_ASSERT(lowstep == (highstep - 1));
                /* loop once more to check for frequency count
                ** or an overflow_step
                */
                midstep = highstep;
                continue;
            }
            else if (highstep == midstep)
            {
                /* greater than all histgram values */
                SYB_ASSERT(highstep == maxstep);
                return(HIT_OVERFLOW);
            }
            else
            {
            lowstep = midstep;
            }
        }
        else
        {
            if (lowstep == midstep)
            {
                /* constant is less than all steps in
                ** histogram
                */
                SYB_ASSERT(!lowstep);
                return(HIT_UNDERFLOW);
            }
            else if (highstep == midstep)
            {
                /* normal exit for constant which is
                ** lowstep < dvp < highstep
                ** thus interpolation is needed to obtain
                ** the fraction of the cell selected
                */
                break;
            }
            else
            {
                highstep = midstep;
            }
        }
        midstep = (highstep + lowstep)/2;
    }
    *stepnop = midstep;
    return(HIT_INTERPOLATE);
}
```

The method functions by performing a binary search on all boundary values for determining which cell the predicate value falls within. If the predicate value falls directly on a cell boundary, the method selects the entire cell, thus eliminating the need to interpolate or to employ a spline histogram. Upon conclusion of the binary search, the method returns (by reference) the cell number which the predicate value fell within together with a "hit type"—that is, how the value "hit" the histogram.

In the currently-preferred embodiment, hit types are defined as follows.

```
/* define a set of cases in which the sarg is related to a histogram
** - a histogram is defined by an order set of boundary values, so that in
** order to estimate the selectivity, the predicate constant is in a
** binary search of the histogram values, to see how it hits the histogram
** cell
** - e.g. r.a = 5 is a predicate, in which "5" is the constant, so that
** if a histogram had a "range cell" with lower bound of "1" and upper bound
** of "10" then the hittype_t would be HIT_INTERPOLATE since the predicate
** constant is between two boundary values of a range cell
*/
typedef int32     hittype_t;
#define HIT_FREQUENCY        1     /* boundary value of histogram is
```

```
                         ** equal to predicate constant and
                         ** moreover, the cell represents a single
                         ** high frequency domain value
                         */
#define HIT_OVERFLOW     2       /* predicate constant is lower than
                         ** all values in the histogram
                         */
#define HIT_UNDERFLOW    3       /* predicate constant is lower than
                         ** all values in the histogram
                         */
#define HIT_NULL         4       /* predicate is IS NULL or IS NOT NULL
                         /*
#define HIT_NULLHISTOGRAM 5      /* histogram has no values except for
                         ** NULL
                         */
#define HIT_RANGEFREQUENCY 6     /* predicate constant is equal to the
                         ** upper bound value of a range cell
                         */
#define HIT_INTERPOLATE  7       /* predicate constant fall inbetween
                         ** the upper and lower bounds of a range
                         ** cell
                         */
```

For instance, "hit frequency" indicates a hit to a cell which is a single value. Suppose that a hit occurred on a cell having a value of just 17. Here, there is really no upper or lower bound, since the cell stores only a single value. Further, a spline would not be applicable to the cell, as the cell again only stores a single value, not a range. A hit type of "hit underflow" indicates that the predicate value is less than any cell of the histogram, that is, the value is outside the range of the histogram. Of particular interest to the present invention is the hit type of "hit interpolate." This indicates that the value hit the histogram such that the value fell between two boundary values and, thus, the system needs to perform an interpolation (i.e., invoke the interpolate method).

When the system has returned from the binary search method, it has at that point obtained a cell number. From the previously-described virtual arrays, the system can lookup for the cell its associated values (i.e., weight and spline). These values are passed to a "spline estimate" method, st_spline_estimate, which calculates the selectivity of the cell. The method may be constructed as follows.

```
/*
**      ST_SPLINE_ESTIMATE
**
**      Given the interpolation fraction and the spline weight calculate the
**      selectivity of the cell including contribution of the spline
component.
**
**      Parameters:
**          total       - total weight of cell
**          spline      - spline component of cell
**          interpolate - percent of cell selected (between 0.0 and
1.0)
**      Returns:
**          selectivity of cell and spline component if it exists
**
**      Side Effects:
**          None
**
*/
SYB_STATIC percent_t
st_spline_estimate(
    weight_t    total,      // total wt of the cell
    weight_t    spline,     // the positive or neg. wt of the
                            spline
    percent_t   interpolate)  // estimate of cell selected
```

```
{
    percent_t  selectivity;
    if (spline >= 0.0)
    {
        /* positive spline */
        /* calculate uniform component */
        selectivity = (total - spline) * interpolate;
        /* add spline component */
        selectivity += spline * interpolate * interpolate;
    }
    else
    {
        /* negative linear spline */
        spline = -spline;         /* get absolute value */
        /* calculate uniform component */
        selectivity = (total - spline) * interpolate;
        /* add spline component */
        interpolate = 1.0 - interpolate;
        selectivity += spline * (1.0 - interpolate * interpolate);
    }
    return (selectivity);
}
```

As shown, the method is invoked with three parameters: total, spline, and interpolate. The total parameter reflects the total weight of the cell. The spline parameter indicates the positive or negative weighting of the spline. The interpolate parameter is the estimate of the portion of the cell selected, which is provided by the interpolate method.

The functionality of the method is divided according to whether the spline is positive or negative. Selectivity is calculated in the case of a positive spline by adding the uniform component to the spline component. First, the uniform component of selectivity is determined by subtracting the spline value or weighting from the total cell weighting and then multiplying that quantity by the interpolate fraction, as follows.

selectivity=(total−spline)*interpolate;

Now, the method adds to the selectivity value the spline component, which is calculated as the spline weighting multiplied by the interpolate fraction squared.

selectivity+=spline*interpolate*interpolate;

In a similar manner, the calculation for a negative spline also adds the uniform component to the spline component.

However in that instance, the uniform component of selectivity is calculated by subtracting the spline weight from the total cell weight and multiplying that value by the interpolate fraction.

selectivity=(total−spline)*interpolate;

To add the spline component, the method first calculates a new interpolate fraction by subtracting the previously-calculated interpolate fraction from the value of 1 as follows.

interpolate=1.0−interpolate;

Now, the selectivity calculation adds the spline component, which is determined by multiplying the spline value by the quantity of 1 minus the interpolate fraction squared, as follows.

selectivity+=spline*(1.0−interpolate*interpolate);

Multi-Attribute Selectivity Optimization Methodology

A. Background

1. General Environment

Recall that every RDBMS system includes basic modules which perform tasks which may be enumerated as follows:

PARSER—reads client statements and transforms them into an internal representation OPTIMIZER—takes the internal representation of the statement and looks at several alternative strategies for obtaining the correct response. The choice made here can mean the response time for the client is seconds, minutes, or hours. The job of the optimizer is to make the best choice using estimations on the cost of various strategies.

EXECUTION ENGINE—An execution strategy decided by the optimizer is now used to obtain the correct response and give the results to the client.

DATA MANAGER—The execution engine makes requests from the DATA manager to obtain information from tables in a way that was determined by the OPTIMIZER e.g., by using indices available, doing table scans, and the like.

The following discussion focuses on the OPTIMIZER portion of an RDBMS system for describing a new technique that is used to obtain accurate estimates of the cost of a particular strategy. Given that the estimate of the cost is more accurate, the corresponding predicted performance of the final execution plan will be more accurate. The result will be better performance of the RDBMS system, including better throughput, and response time for DSS queries (Decision Support System). By way of contrast, inaccurate estimates could predict an operation may take a few seconds, when in fact it would take minutes or hours. This mistake could be magnified in the context of a complex query resulting in unacceptable performance

2. Problem Encountered and Prior Attempts to Address the Problem

The cost estimates made by the optimizer in prior art SQL database servers were inaccurate which resulted in poor execution plan strategies being selected. The previous workarounds for poor optimizer plan selection would be to override the optimizer selection explicitly with a "force plan option" or a "force index option". Overriding the optimizer is a highly-skilled, labor-intensive job, and as a result, a very costly proposition for the database customer. One of the main advantages of the RDBMS system is that this type of work should be done automatically. The normal mode of operation is that the optimizer should automatically adjust execution plans given that the data distributions in the RDBMS changes over time. If explicit overrides are specified, then this advantage of an RDBMS is negated and the costly analysis may need to be repeated over and over again. Some customers refuse to adopt this approach and demand the optimizer gets corrected.

Further, a growing part of an RDBMS business need to support the "VAR" (value-added reseller) applications such as Peoplesoft, Seibel, and Baan. In these cases, the ultimate customer may not even have the ability to use "force" options since only the VAR has the ability to change the application. The VARs in general do not want to make RDBMS vendor specific changes to their application for problems in the Sybase optimizer. The demand is made that Sybase needs to chose the correct plan without explicit override options.

B. Overview of Preferred Optimization

One difficult problem in optimization is accurate multi-attribute selectivity estimation since the concept of correlation between attributes is difficult to capture. In the single attribute case, histograms are used to capture selectivity of a single column but this cannot always accurately be combined to produce multi-attribute selectivities.

Consider, for example, a table usa(state, city, sex, . . . ) which had one row for everyone in the USA, with the following query being executed.

select*from usa where usa.state="CA" and usa.city="Los Angeles" and usa.sex="F"

Suppose an index on (state, city, sex) was created which would gather statistics implicitly on "state", and statistics were explicitly gathered on "city", "sex". Information that the optimizer will have about these equi-sargs are as follows:

selectivity of usa.state="CA"
selectivity of usa.city="Los Angeles"
selectivity of usa.sex="F"
density of usa.state
density of usa. city
density of usa.sex
multi attribute density of (usa.state, usa.city)
multi-attribute density of (usa.state, usa.city, usa.sex)

In order to estimate the selectivity of the "where" clause, which approach does one choose:

(1) Use product of selectivities for independent events—This does not seem quite right since "everyone who lives in Los Angeles also lives in CA" so that no extra selectivity is introduced by the usa.state predicate.

(2) Use the multi-attribute density on (usa. state, usa. city, usa. sex)—This does not seem quite right since the density is an average for all cities and since Los Angeles is a large city, using the density will probably underestimate the row count. Since there will probably be a frequency count cell in the histogram, it would be desirable to take advantage of this extra information.

In accordance with the present invention, ones employs a combination of all the above pieces of information and weighs the densities by how much the selectivity deviates from the single attribute density and by how much the multi-attribute densities differ from one another. Then, the multi-attribute densities are used to scale estimates between extremes of total independence and total dependence.

Consider, for example, the following query:

select*from usa where usa. state="CA" and usa. city="Los Angeles"

Here, "city" provides all the selectivity, no extra selectivity is provided by "state", thus one should not assume independent events, but instead only use the selectivity of "Los Angeles". Thus, the above query would answer the question: if 1,000,000 people lived in "Los Angeles" then how many of those people also live in California? The obvious answer would of course be all 1,000,000 people live in California. However, the opposite is true in the following query:

select*from usa where usa.city="Los Angeles" and usa.sex="F"

Here, since "city" and "sex" are independent events, one should multiply selectivities for each attribute. Thus, the above query would answer a similarly structured question very differently, if 1,000,000 people lived in "Los Angeles" then how many of those people are female? The obvious answer would be about 50% or 500,000 people are female. The above examples shows a simple two attribute case but this can be extended to any number of attributes and applied to any composite key index for costing.

In accordance with the present invention, the formula used is iterative and is based on the following parameters:

prev_sel=selectivity of equi-sargsfor attributes $a_1, \ldots, a_i$
    single_sel=selectivity of equi-sarg on attribute $a_{(1+i)}$
    prev_den=multi-attribute density of attributes $a_1, \ldots, a_i$
    curr_den=multi-attribute density of attributes $a_1, \ldots, a_{(1+i)}$
    attr_den=single attribute density of $a_{(1+i)}$ The above densities are fractions of 1.0, and the formula to calculate the selectivity of equi-sargs $a_1, \ldots, a_{(i+1)}$ is if (prev_den>attr_den)

new_sel=single_sel*(prev_sel+(1.0−prev_sel)*(curr_den/attr_den−prev_den)/( 1.0−prev_den))

else new_sel=prev_sel*(single_sel+(1.0−single_sel)*(curr_den/prev_den−attr_den)/(1.0−attr_den))

The formulae try to implement a linear model between the cases in which the correlation between the current attribute a, and the next minor attribute $a_{(i+1)}$ is either 0% or 100%. The "if" statement determines which density dominates the calculation, i.e, either the prev_den $(a_1, \ldots, a_i)$ or the attr_den $(a_{(i+1)})$. Note that if the attribute $a_{(i+1)}$ is independent of the attributes $(a_1, \ldots, a_i)$, then one approximately should get:

curr_den $(a_1, \ldots, a_{(i+1)})$~=prev_den $(a_1, \ldots, a_i)$*attr_den $(a_{(i+1)})$ However, if attributes are totally dependent then no extra selectivity is introduced by the addition of the new attribute as, then the density of the dominating attribute(s) should be selected i.e., the formula should behave as follows:

curr_den $(a_1, \ldots, a_{(i+1)})$~=min (prev_den $(a_1, \ldots, a_i)$, attr_den $(a_{(i+1)})$)

Once the dominating density, Dden, is determined, i.e., the most selective density, it is used to modify the submissive density, Sden. If one considers the respective dominating selectivity to be called Dsel and the submissive selectivity to be Ssel, then the basic formula reduces to:

new_sel=Dsel*(Ssel+(1.0−Ssel)*(curr_den/Dden−Sden)/(1.0−Sden))

The formula reduces to new_sel=Dsel*Ssel for independent events since curr_den~=Dden*Sden so that the scaling term becomes zero. However, the formula reduces to new_sel=Dsel for totally dependent events, since curr_den~=Dden, as no reduction in duplicate count is introduced for a dependent event. Between these extremes the formula provides linear scaling.

Figure 8:
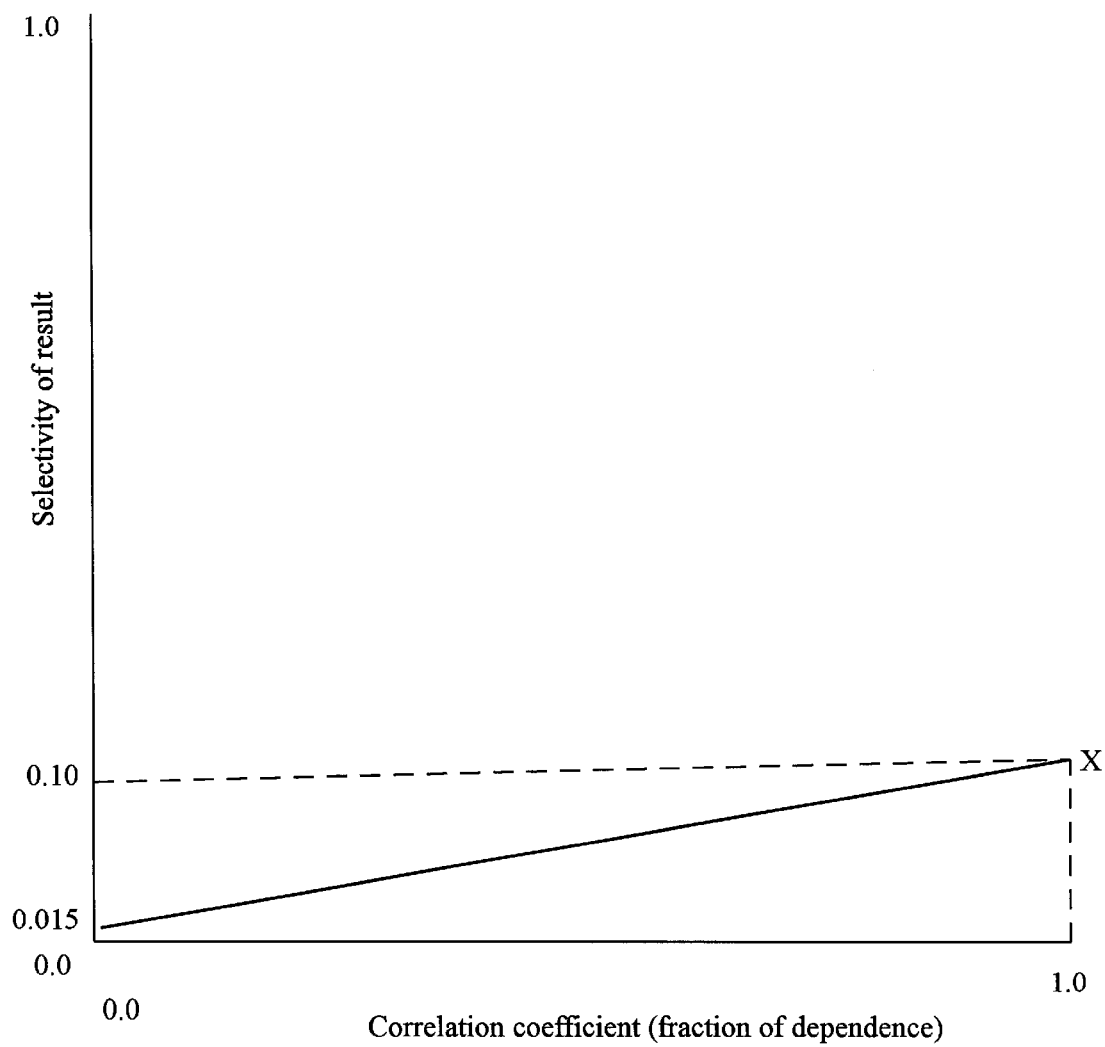
FIG. 8 is a diagram illustrating an example where multiple attributes are totally dependent.

FIG. 8 graphically illustrates total dependence in which the point on the linear scale defined by the average correlation of the relationship between the two attributes is at one extreme end of the curve marked by "X", i.e., 0.10 selectivity. The desired result is that no extra selectivity is added by "state" since it is totally dependent on "city".

usa. city="Los Angeles" and usa. state="CA"
    selectivity of "Los Angeles" is 0.10
    selectivity of "CA" is 0.15
    city density (average run of duplicates for city)=0.015
    state density (average run of duplicates for state)=0.02
    (city, state)density (average run of duplicates for pair)= 0.015

The position the linear scale for correlation independence is selected by density average calculation only, and since 0.015*1.0=0.015 indicates total dependence, the same scaling is used i.e., 0.10*1.0=0.10. No extra selectivity is added by "state" since it is totally dependent on "city".

Figure 9:
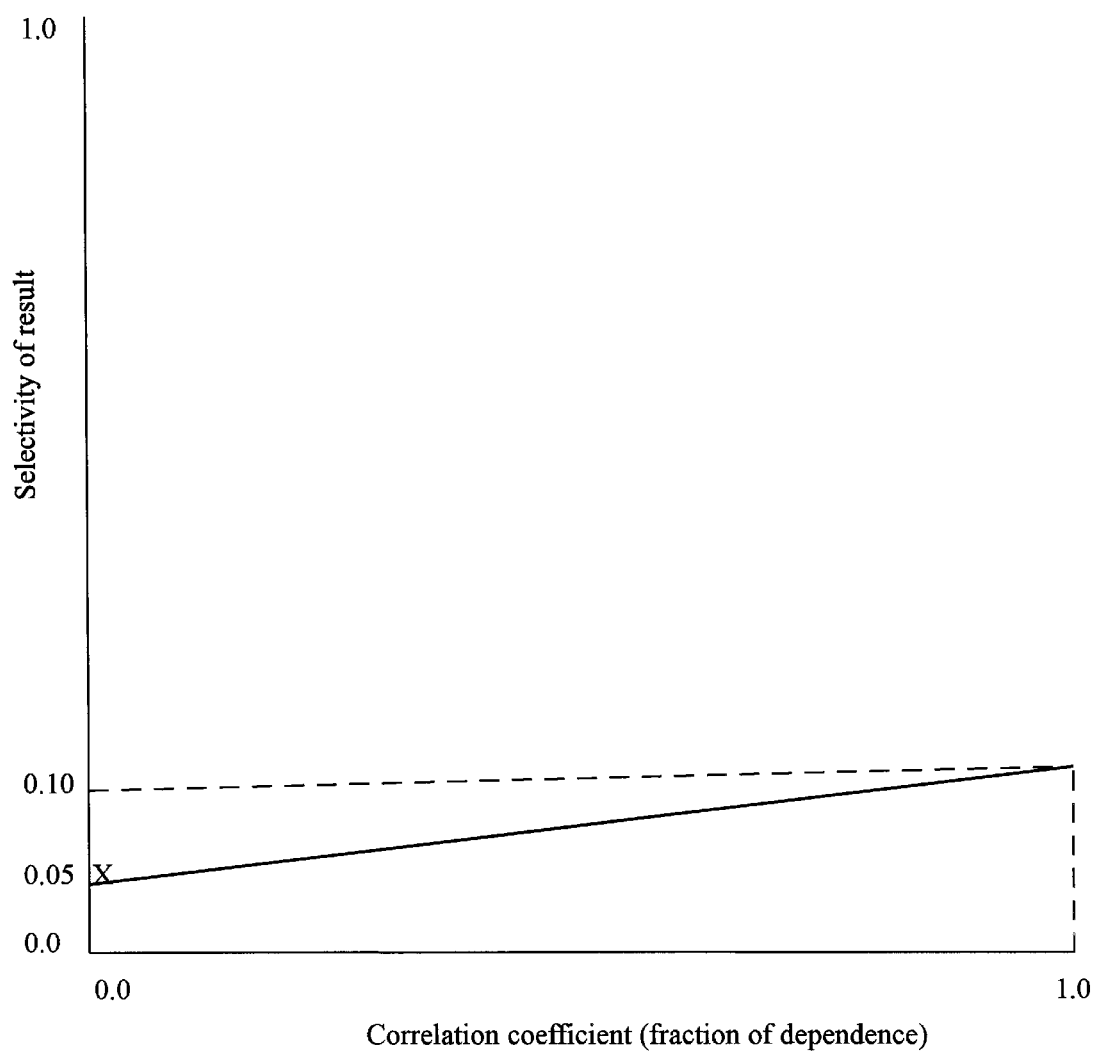
FIG. 9 is a diagram illustrating an example where multiple attributes are totally independent.

FIG. 9 graphically illustrates total independence in which the point on the linear scale defined by the average correlation of the relationship between the two attributes is at one extreme end of the curve marked by "X", i.e., 0.05 selectivity.

usa. city="Los Angeles" and usa. sex="F"
    selectivity of "Los Angeles" is 0.10
    selectivity of "F" is 0.50
    city density (average run of duplicates for city)=0.02
    sex density (average run of duplicates for sex)=0.5
    (city, sex) density (average run of duplicates for pair)= 0.01

The position the linear scale for correlation independence is selected by density average calculation only, and since 0.02*0.5=0.01 indicates total independence, the same scaling is used, i.e., 0.10*0.5=0.05.

C. Implementation

1. Pseudo-code a. Overall Methodology

Figure 10:
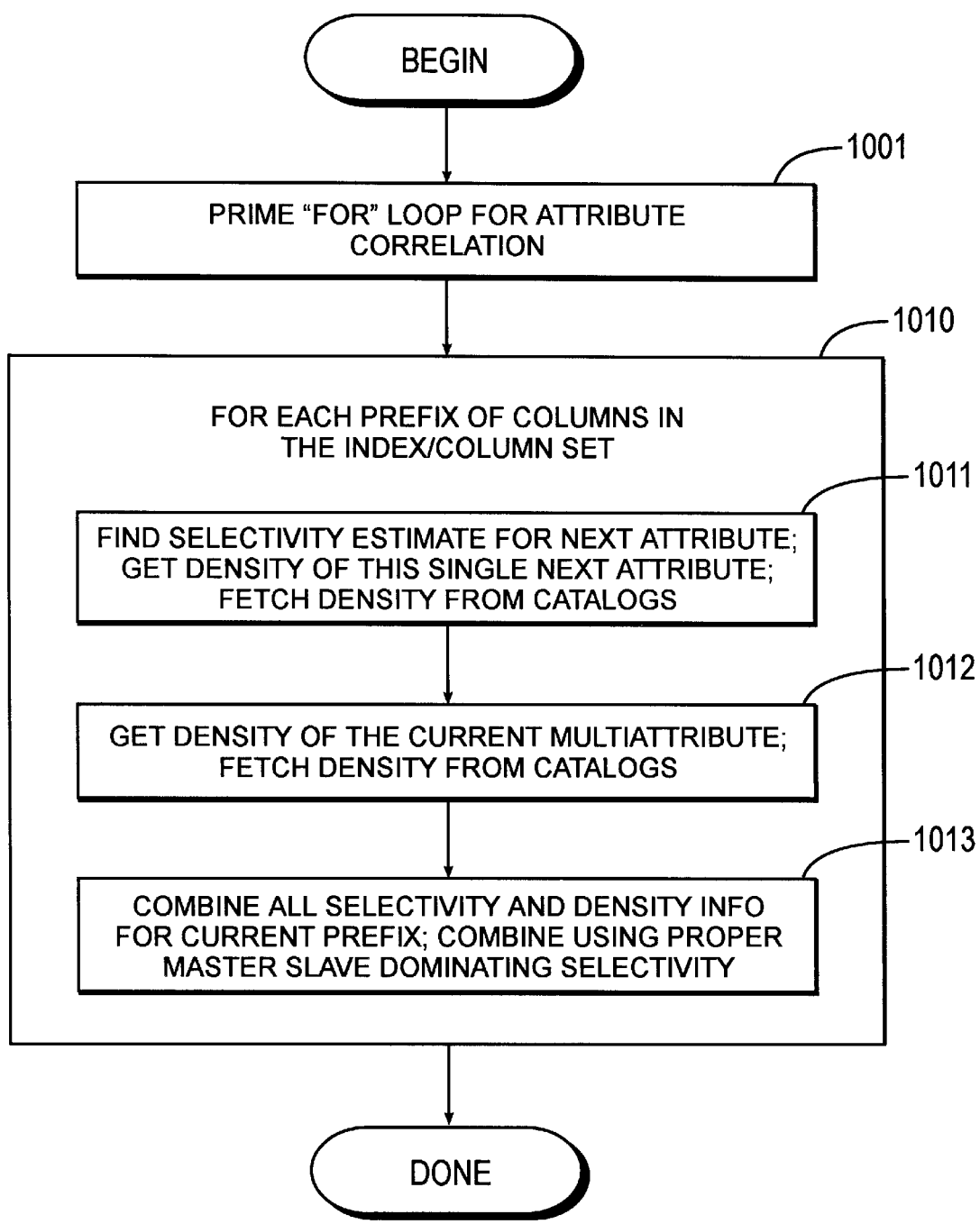
FIG. 10 is a flowchart illustrating the overall method of the present invention for providing multi-attribute selectivity cost estimates.

The following pseudo-code, in conjunction with FIG. 10, illustrates the overall method of the present invention for providing multi-attribute selectivity cost estimates.

```
/* basic routine to combine selectivities by taking correlation
** into account
*/
ic_combine_density( )
    /* Step 1001 */
    /* prime the FOR loop for attribute correlation*/
    ic_findcolcost( )
    stu_getdensity( )
    /* Step 1010 */
    for each prefix of columns in the index/column set
    begin
        /* add only correlated component to the
        ** final selectivity estimate
        */
        /* Step 1011 */
        /* find selectivity estimate for next attribute
        */
        ic_findcolcost( )
        /* get density of this single next attribute */
```

```
            stu_getdensity( )
                /* fetch density from catalogs */
                stu_colstat_density( )
        /* Step 1012 */
        /* get density of the current multi-attribute
        ** prefix considered so far
        */
        stu_getdensity( )
                /* fetch density from catalyst */
                stu_colstat_density( )
        /* Step 1013 */
        /* combine all selectivity and density info
        ** for current prefix
        */
        ic_combine_equisargs( )
                /* combine using proper master slave
                ** dominating selectivity
                */
                ic_factordensity( )
end
``` b. Evaluating Selectivity

The following pseudo-code illustrates the approach for evaluating selectivity. Consider evaluating selectivity for following attributes $(a_1, a_2, \ldots a_n)$.

```
/* initialize loop variables
**
** assume all selectivity and density values are a fraction
** between 0.0 and 1.0 which represent a fraction of the
** rows in the respective table be analyzed for selectivity
** of predicates.
*/
previous_density = GetDensity(a1);
final_selectivity = GetSelectivity(a1);
cnt = 2;
while (cnt <= n) /* look at a1, a2, . . . an*/
{
    /* get single attribute selectivity */
    single_selectivity = GetSelectivity(a cnt );
    /* get single attribute density */
    single_density = GetDensity(a cnt );
    /* get multi-attribute composite density */
    multi_density = GetDensity((a1, a2. . . acnt );
    /* adjust selectivity based on correlation */
    final_selectivity = ic_combine_equisargs(
        final_selectivity,
        previous_density,
        multi_density,
        single_density,
        single_selectivity);
    previous_density = multi_density;
}
return (final_selectivity);
/* define ic_combine_equisargs( ) puesdo code to determine
** dominant term, and then calculate correlation coefficient
** to apply to selectivity estimate
*/
ic_combine_equisargs ( previous_selectivity,
    previous_density,
    multi_density,
    single_density,
    single_selectivity)
{
    /* determine correlation coefficient by looking at
    ** previous_density, multi_density, single_density
    ** and apply it to find the correct percentage of
    ** selectivity to adjust.
    */
    if (previous_density > single_density)
    {
        /* minor attribute dominant, so previous
        ** atttributes are collectively passive */
        selectivity = single_selectivity *
            ic_factordensity( single_density,
                previous_density,
                multi_density,
                previous_selectivity)
    }
    else
    {
        /* previous attributes dominant */
        selectivity = previous_selectivity *
            ic_factordensity(previous_density,
                single_density,
                multi_density,
                single_selectivity);
    }
    return (selectivity);
}
/* calculate correlation coefficient and apply to selectivity
*/
ic_factordensity(driving_density,
    minor_density,
    current_density,
    minor_selectivity)
{
    correlation = current_density/minor_density;
    /* adjust the minor selectivity by adding some
    ** fraction based on how correlated the values are
    ** so that totally independent events leave the
    ** minor_selectivity unchanged (i.e. add 0.0) and
    ** totally dependent events adds a value so that
    ** minor_selectivity is 1.0)
    */
    minor_selectivity += (1.0 − minor_selectivity) *
        (correlation − driving_density) /
        (1.0 − driving_density);
    return (minor_selectivity);
}
```

2. Source Code Implementation

The actual code follows the pseudo-code closely, with the added complications used for boundary condition checks and adjustments for statistics gathered at different times in maintenance cycles. In other words, statistics gathering is done on a live database in which changes could be frequent; boundary checks are needed so that estimates do not go negative when values are slightly past a boundary condition.

Given an array of columns in colid array which has maxkey entries which is guaranteed by the caller to have equi-sargs available, ic_combine_density combines the selectivities on the multi-attribute index, by factoring them in proportion to a formula based on the densities of the columns. It may be implemented as follows (e.g., using the C programming language).

```
/*
**      IC_COMBINE_DENSITY
**
**      Parameters:
**              icp - index cost state struct which provides information
**                      on the statistics available for index costing
**              colidarry - array of columns with equi-sargs
**              maxkey - number of elements in colidarray
**
**      Returns:
**              selectivity of the set of attributes in colidarray
**
*/
SYB_STATIC percent_t
ic_combine_density(
        IC_STATE        *icp,
        colid_t         *colidarray,
        colct_t         maxkey)
{
        colct_t         keyi;
        ST_TABLE        *tabstatp;
        IC_COLCOST      *colcostp;
        percent_t       previous_density;
        percent_t       single_density;
        percent_t       multi_density;
        percent_t       limit_selectivity;
        percent_t       equisarg_selectivity;
        percent_t       sarg_selectivity;
        SYB_BOOLEAN     use_sarg_density;
        tabstatp = icp—>tabstatp;
        colcostp = ic_findcolcost (icp, *colidarray);
        equisarg_selectivity = colcostp—>sarg_selectivity;
        /* for all single attribute densities, use the sarg density only
        ** if the sarg density was used in the estimation, in most cases
        ** this would mean the estimate is equal to the density, the only
        ** exception would be if the upper limit set by the range cell
        ** is lower than the density, then the estimate would equal the
        ** upper limit
        */
        use_sarg_density = (colcostp—>ic_status & IC_SARGDENSITY) != 0;
        previous_density = stu_getdensity(tabstatp, 1, colidarray,
                                        !use_sarg_density);
        limit_selectivity = colcostp—>limit_selectivity;
        /* first density value has been initialized so look at minor
        ** attributes starting at keyi == 1, since zero indexing is used
        */
        for (keyi = 1; keyi < maxkey; keyi++)
        {
                colcostp = ic_findcolcost (icp, colidarray[keyi]);
                /* use compatible single attribute density that was
                ** associated with the selectivity estimate of the column
                */
                single_density = stu_getdensity(tabstatp, 1,
                                        &colidarray[keyi],
                                        !(colcostp—>ic_status & IC_SARGDENSITY));
                /* use multi-attribute style density that was associated
                ** with the first attribute of the colidarray
                */
                multi_density = stu_getdensity(tabstatp, keyi+1,
                                        colidarray,
                                        !use_sarg_density);
                if (multi_density > previous_density;
                {
                        /* new columns should always add more selectivity
                        */
                        multi_density = previous_density;
                }
                if (limit_selectivity > colcostp—>limit_selectivity)
                {
                        limit_selectivity = colcostp—>limit_selectivity;
                }
                sarg_selectivity = colcostp—>sarg_selectivity;
                if ((multi_density > 0.0) &&
                   (single_density == ST_MAGIC_EQ))
                {
                        /* if magic is used for the single attribute
                        ** density then assume the multi-attribute
                        ** density is preferrable and do not do
                        ** any adjustment other than the correlation
```

```
            ** between the previous density and multi
            ** density
            */
            if (sarg_selectivity == ST_MAGIC_EQ)
            {
                single_density = multi_density /
                    previous_density;
                sarg_selectivity = single_density;
            }
            else
            {
                single_density = sarg_selectivity;
            }
        }
        equisarg_selectivity = ic_combine_equisargs(
                equisarg_selectivity,
                previous_density,
                multi_density,
                single_density,
                sarg_selectivity,
                limit_selectivity);
        previous_density = multi_density;
    }
    return(equisarg_selectivity);
}
```

The previous N equisargs have produced previous_selectivity, and the previous_density was obtained on those N equisargs. The information is now used by ic_combine_equisargs to combine with the Nth attribute whose single attribute selectivity is given in sarg_selectivity and whose single attribute density is given in single_density. The multi-attribute density of the first N+1 attributes is given by multi-density. The alternative to using density is to just multiply all the equisarg selectivities together, and assume independent events. However, the densities provides some clue as to how correlated the attributes are. The ic_combine_equisargs routine may be constructed as follows.

```
/*
**      IC_COMBINE_EQUISARGS
**
**
**      Parameters:
**          previous_selectivity - selectivity of first N equi-sargs
**          previous_density - density of first N attributes
**          multi_density - density of first N+1 attributes
**          single_density - density of the Nth+1 attribute
**          sarg_selectivity - selectivity of the Nth+1 attribute
**          limit_selectivity - upper bound for any estimate of
**                  this routine
**
**      Returns:
**          selectivity estimate of first N+1 attributes
**
*/
SYB_STATIC percent_t
ic_combine_equisargs(
        percent_t   previous_selectivity,
        percent_t   previous_density,
        percent_t   multi_density,
        pecent_t    single_density,
        percent_t   sarg_selectivity,
        percent_t   limit_selectivity)
{
    percent_t   selectivity;
    /* - combine the selectivities of multi-attribute keys
    ** using the multi-attribute densities as a measure of
    ** how correlated the columns are i.e. whether the
    ** extra column provides any further uniqueness
    ** - the more different the next multi-column density
    ** becomes, implies that more uniqueness is provided by
    ** the key, and the scan selectivity is probably closer
    ** to the product of the selectivities
    */
    if (previous_density > single_density)
    {
```

```
            /* this tends to imply that the minor attribute of the
            ** index is selective, so the assumption is made that this
            ** minor attribute dominates the selectivity and that
            ** the effectiveness of the major attributes are
            ** scaled proportionally
            */
            selectivity = sarg_selectivity * ic_factordensity(
                    single_density, previous_density, multi_density,
                    previous_selectivity);
        }
        else
        {
            /* the major attributes of the index are more selective */
            selectivity = previous_selectivity * ic_factordensity(
                    previous_density, single_density, multi_density,
                    sarg_selectivity);
        }
        /* sanity check for any absolute upper bound */
        if (selectivity > limit_selectivity)
        {
            selectivity = limit_selectivity;
        }
        return (selectivity);
}
```

When combining selectivities, there is a driving density and a minor density. By definition "driving density" is more selective than the minor density. The attributes of the "driving density" plus the attributes of the "minor density" equals the attributes used to from the current_density. The idea being that unless "driving density"*"minor density"= current_density, then there is some correlation between the attributes being combined. A selectivity estimate of the union of attributes represented by driving density and minor_density is provided by ic_factordensity, as follows.

```
/*
**      IC_FACTORDENSITY
**
**
**      Parameters:
**          driving_density - density of a set of attributes such that
**              this is less than minor_density
**          minor_density - density of a set of attributes such that
**              this is greater than driving density
**          current_density - density of the union of attributes
**              defined by driving_density and minor_density
**          minor_selectivity - selectivity of the attributes
**              associated with the minor_density
**
**      Returns:
**          selectivity estimate of union of attributes represented by
**          driving_density and minor_density
**
*/
SYB_STATIC percent_t
ic_factordensity(
        percent_t   driving_density,
        percent_t   minor_density,
        percent_t   current_density,
        percent_t   minor_selectivity)
{
        percent_t   correlation;
        /* use densities to determine the correlation of equi-sargs
        ** and scale the minor selectivity in proportion to the
        ** hints given by the densities
        */
        /* density selectivity should be monotonically increasing
        ** but they could get out of sync since update statistics
        ** on different indices which have some common prefix
        ** of major attributes could change the densities in
        ** different time lines which could cause the following
        ** anomolies
        */
        if (current_density > driving_density)
        {
            current_density = driving_density;
        }
        correlation = current_density/minor_density;
        if (correlation < driving_density)
        {
            /* no correlation at all, so assume fully
            ** independent events
            */
            correlation = driving_density;
        }
        if (driving_density < 1.0)
        {
            /* add back in some correlation factor if
            ** attribute is not an independent event
            */
            minor_selectivity += (1.0 - minor_selectivity) *
                (correlation - driving_density) /
                (1.0 - driving_density);
            if (minor_selectivity > 1.0)
            {
                /* should only happen with slight
                ** roundoff errors
                */
                minor_selctivity = 1.0;
            }
        }
        return (minor_selectivity);
}
```

The following code is used during suggested maintenance runs to gather the multi-attribute density values which are important for estimating the correlation between attributes during the optimization phase. The density values gathered in this phase are made persistent in the system catalogs and retrieved as necessary by the optimization phase which determines the access path and access methods to use based on accurate selectivity estimates calculated by these techniques. For any set of attributes (especially those associated with a composite index) it is possible to scan the respective rows in sorted order. The density (or average run of duplicates) for "EACH PREFIX" is captured by the code below. For example, if an 10 attribute index is scanned in an ordering as follows $(a_1,a_2,a_3, \ldots a_{10})$, then 10 separate density values are computed i.e., each prefix $(a_1)$, $(a_1,a_2)$, $(a_1,a_2,a_3) \ldots (a_1,a_2,a_3,a_4, \ldots, a_{10})$. Each of these densities is subsequently used in optimization to estimate the correlation between itself and the previous prefix. The computation of single attribute densities is common in the industry, but the computation of "composite densities" is unique to Sybase architecture and is an important part of the correlation estimates.

The routine ups_density_gather is called once for each index row, and it updates the density accumulators in statp which will be used for the final density calculation of all densities associated with an index.

```
/*
**      UPS_DENSITY_GATHER
**
**      Parameters:
**          statp                ptr to global variables for statistics evaluation
**          nullkey_offset  index row column position at which first NULL
**                               is found (where 0 represents 1st column, 1 is 2nd
**                               etc)
**          keycnt               number of columns in index
**          keydiff_offset  first position in index in which a change of
**                               value is about to occur (where 0 represents 1st
**                               column, and 1 is 2nd column etc)
**          valuep               ptr to value being scanned
**          vallen               length of value being scanned
**
**      Returns:
**
**          None.
**
*/
SYB_STATIC void
ups_density_gather (
        STATCALC        *statp,
        colid_t         nullkey_offset,
        colid_t         keycnt,
        colid_t         keydiff_offset,
        BYTE            *valuep,
        length_t        vallen)
{
        colid_t         keyi;           /* keyi+1 is number of prefix
                                        ** columns
                                        ** of index currently being
                                        ** analysed
                                        */
        STATDENSITY     *density;       /* ptr to density accumulator
                                        ** values */
        STAT_SARGDENSITY *sargdensityp; /* ptr to buffer for collecting
                                        ** sarg density estimates
                                        */
/*
** Accumulate density statistics for each prefix of index columns,
** i.e. for the first, first and second, first through third
** columns, etc.
*/
for (keyi = 0; keyi < keycnt; keyi++)
{
        density = &statp—>stdensity[keyi];
        sargdensityp = &statp—>st_dencalc.stat_activesargp
                —>stat_sargarrayp[keyi];
        /*
        ** Update equal key count and do sigma calculation.
        ** keydiff_offset tells which column was the first where
        ** the keys were not equal.
        */
        density—>steqkeys += 1.0;
        if (keyi >= keydiff_offset)
        {
            rowct_t         nsubi;
            nsubi = density—>steqkeys;
            nsubi *= nsubi; /* n sub i squared */
            /*
            ** Exclude NULL values from the calculation
            ** for total density if any key in the set
            ** is NULL, eg. density on (a,b,c) will NOT
            ** include NULL values if any of key columns
            ** a, b, or c is NULL.
            */
            if (keyi < nullkey_offset) /* if key is not null */
```

```
                {
                        density—>stjoinsigma += nsubi;
                        density—>stnonnullr +=
                        (density—>steqkeys);
                }
                /*
                ** Only add N(i) squared to regular sigma if not
                ** include in more than one step. What this means
                ** is if the number of duplicates from where this
                ** set begins goes over 2 step boundaries, do not
                ** include them in the search clause density.
                ** Notice that the first step (step 0)
                ** is initialized by statinit and
                ** statgather is called with subsequent steps.
                **
                ** This is done since if a value crosses 2 steps
                ** then we are guaranteed to fall on a step value
                ** for a sarg when estimating so we will not be
                ** using the inbetween estimate. When histograms
                ** are used, the equivalent to this would be to
                ** exclude any frequency count cells since the
                ** estimation routines should be exact if a
                ** frequency value is selected.
                ** However, since we do not have multi-attribute
                ** histograms yet, the multi-attribute sarg
                ** should probably not execute the following since
                ** these are only used for equi-sargs estimation
                ** and not for interpolation in a range cell.
                */
                if (density—>steqkeys < statp—>st_width)
                {
                        density—>stscsigma += nsubi;
                        density—>stonestepr += (density—>steqkeys);
                        /* save sarg density info in buffer
                        ** until it can be determined whether
                        ** rows belong to frequency count cell
                        */
                        sargdensityp—>stat_sumsquares += nsubi;
                        sargdensityp—>stat_sarg_sum +=
                                density —>steqkeys;
                }
                /*
                ** Reset for the next set of keys, eg. index
                ** on (a,b,c) will have densities on three
                ** different sets, (a), (a,b) and set (a,b,c).
                */
                density—>steqkeys = 0.0;
        }
}
if (!keydiff_offset && vallen)
{
        /* Special processing for sarg density computation */
        /* major attribute has changed values so terminate
        ** processing rows for this major column value
        ** - make sure value is not NULL, since NULLs are always
        ** considered frequency cells and are not part of the sarg
        ** density
        ** - adding sarg density values to main accumulator is
        ** delayed until it can be verified that the value is
        ** not a frequency count
        */
        MEMMOVE(valuep, statp—>st_dencalc.stat_activesargp—>
                stat_majorattr.st_valuep, vallen);
        statp—>st_dencalc.stat_activesargp—>
                stat_majorattr.st_vallen = vallen;
        /* major attribute changed values so determine if the
        ** end of the sarg density circular list needs to be
        ** 1) accumulated by checking for frequency counts in
        **    the partially built histogram or
        ** 2) thrown away because rows below to a frequency cell
        */
        statp—>st_dencalc.stat_activesargp = statp—>st_dencalc.
                stat_activesargp—>stat_nextsargdenp;
        stat_sargden_accumulate(statp);
    }
}
```

The stat_sargden_accumulate routine will be called once for every domain value of the major attribute on which the histogram is being built. The purpose of this routine is to search the partially built histogram to determine if a frequency cell has been created for this domain value. If a frequency value has not been created then the partial sarg computations are placed into the main sarg accumulator, otherwise they are just thrown away.

```
/*
**      STAT_SARGDEN_ACCUMULATE
**
**      Parameters:
**          statp              ptr to global variables for statistics evaluation
**
**      Returns:
**
**          None.
**
*/
SYB_STATIC void
stat_sargden_accumulate(
        STATCALC         *statp)
{
        stepct_t         laststep;
        ST_DATAVALUE     step_dv;         /* contains histogram step
                                          ** value being analyzed
                                          */

SYB_BOOLEAN      is_ptr;
        ST_HISTOGRAM     *histp;          /* histogram of major attribute
                                          */
        STAT_SARGDENINFO *lastsargp;
        ST_DATAVALUE     lower_dv;
        stepct_t         stepct;          /* current step of histogram
                                          ** being analyzed
                                          */
        length_t         fixedlength;     /* max length of datatype
                                          */
        int              compare_result;
        lastsargp = statp—>st_dencalc.stat_activesargp;
        if (lastsargp—>stat_sargarrayp[0].stat_sarg_sum == 0.0)
        {
                /* end of current list does not have any weight
                ** which occurs when the first few values of the
                ** table are being analyzed
                */
                return;
        }
        histp = statp—>st_histp;
        /* - get current largest active step associated with histogram
        ** - the step count never is larger than the steps requested
        ** by the user, but if the initial row estimate is incorrect
        ** then it is possible to try to get more sets, but all
        ** extra steps are folded into the last step i.e.
        ** histp—>st_requestedstepct
        */
        compare_result = -1;
        laststep = ((statp—>st_stepct > histp—>st_requestedstepct) ?
                histp—>st_requestedstepct : statp—>st_stepct) - 1;
        is_ptr = (histp—>st_status & STHT_PTR) != 0;
        STRUCTASSIGN(histp—>st_steps.st_dt, step_dv.st_dt);
        fixedlength = is_ptr ? sizeof(BYTE *) : step_dv.st_dt.st_length;
        for (stepct = laststep ;stepct >= 0; stepct--)
        {
                step_dv.st_valuep = stu_findslot((PROC_HDR *)NULL,
                        &histp—>st_steps.st_boundary,
                        fixedlength , stepct,
                        histp—>st_requestedstepct);
                if (is_ptr)
                {
                        step_dv.st_valuep = *(BYTE **)step_dv.st_valuep;
                        step_dv.st_vallen = *(step_dv.st_valuep++);
                }
                else
                {
                        step_dv.st_vallen = step_dv.st_dt.st_length;
                }
                compare_result = stu_compare(&step_dv,
                        &lastsargp—>stat_majorattr);
                if (statp—>st_descending)
                {
                        /* check for descending index scans and change
```

-continued

```
                ** sign of comparison to compenstate
                */
                compare_result = −compare_result;
            }
            if (compare_result >= 0)
            {
                break;
            }
        }
        if ((stepct == laststep) && compare_result > 0)
        {
            /* sarg is part of a range cell so accumulate sarg
            ** densities for this run
            */
            ;
        }
        else if (!compare_result && (stepct > 0))
        {
            /* check for frequency cell */
            STRUCTASSIGN(step_dv.st_dt, lower_dv.st_dt);
            lower_dv.st_valuep = stu_findstat ((PROC_HDR *) NULL,
                &histp—>st_steps.st_boundary,
                fixedlength, stepct−1,
                histp—>st_requestedsteptct);
            if (is_ptr)
            {
                lower_dv.st_valuep = *(BYTE **)lower_dv.st_valuep;
                lower_dv.st_vallen = *(lower_dv.st_valuep++);
            }
            else
            {
                lower_dv.st_vallen = lower_dv.st_dt.st_length;
            }
            if (statp—>st_descending ?
                    stu_dense_frequency(&step_dv, &lower_dv) :
                    stu_dense_frequency(&lower_dv, &step_dv))
            {
                /* do not include frequency cells in sarg density*/
                init_sargdensity(lastsargp, statp—>st_dencalc.
                            stat_densitycolct);
                return;
            }
        }
    }
    /* add sarg density values to main accumulator, since the values
    ** are not part of a frequency cell
    */
    stat_sargdensity_found(statp, lastsargp—>stat_sargarrayp);
}
```

The stat_sargdensity_found routine will be called when it has been determined that the sarg partial computation needs to be added to the main sarg density accumulator. All the partial values are moved to the accumulator and the partial accumulator structure is reinitialized for subsequent use.

```
/*
**      STAT_SARGDENSITY_FOUND
**
**      Parameters:
**          statp              ptr to global variables for statistics evaluation
**          lastsargp          ptr to buffer of partial sarg density computations
**
**      Returns:
**
**          None.
**
*/
SYB_STATIC void
stat_sargdensity_found(
        STATCALC           *statp,
        STAT_SARGDENSITY   *lastsargp)
{
        STATDENSITY        *density;       /* ptr to density accumulator
                                           ** values*/
        colct_t            keyi;
```

-continued

```
STAT_SARGDENSITY  *sargdensityp;
for (keyi = 0; keyi < statp—>st_dencalc.stat_densitycolct; keyi++)
{
    /* accumulate the sarg densities sums since the value is
    ** in a range cell
    */
    density = &statp—>stdensity[keyi];
    sargdensityp = &lastsargp[keyi];
    density—>stscsigma += sargdensityp—>stat_sumsquares;
    sargdensityp—>stat_sumsquares = 0.0;
    density—>stonestepr += sargdensityp—>stat_sarg_sum;
    sargdensityp—>stat_sarg_sum = 0.0;
}
}
```

While the invention is described in some detail with specific reference to a single-preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a computer system providing a database storing database objects, a method for improving determination of cost estimates associated with data access occurring during execution of a database query, the method comprising:

receiving a database query specifying a database operation for at least one database object, said database query specifying a query condition for selecting particular rows based on multiple attributes of said at least one database object; and determining an estimate for the cost associated with a query execution path for executing the database query by:

determining selectivity information providing a selectivity estimate for each of said multiple attributes, determining correlation information providing a measure of how well at least some of said multiple attributes are correlated, and combining said selectivity information together, based at least in part on said correlation information, for determining a multi-attribute selectivity estimate for the query condition.

2. The method of claim 1, wherein correlation between two attributes is determined based on how much a particular value specified in the database query for one attribute depends on a given value specified in the database query for another attribute.

3. The method of claim 2, wherein correlation between two attributes may very between total independence and total dependence.

4. The method of claim 1, wherein said combining step includes:

adding selectivity information for an attribute only if a particular value specified in the database query for the attribute is not totally dependent on a given value specified in the database query for another attribute whose selectivity information has been taken into account.

5. The method of claim 1, wherein said determined selectivity information provides a measure of the fraction of rows of said at least one database object that satisfy said query condition.

6. The method of claim 1, wherein each of said multiple attributes corresponds to a particular column of said at least one database object.

7. The method of claim 1, further comprising:

formulating a query execution plan for providing access to said a least one database object, said query execution plan including an access strategy based at least in part on the determined multi-attribute selectivity estimate.

8. The method of claim 1, wherein said formulating a query execution plan step includes determining a particular access path for use by access methods, for executing the database query.

9. The method of claim 1, wherein said at least one database object comprises a database table.

10. The method of claim 1, wherein said at least one database object comprises a database index.

11. A database system employing cost estimates comprising:

a database storing database objects;

an optimizer which employs cost estimates for formulating query access plans in response to receiving a database query specifying a database operation for at least one database object, said database query specifying a query condition for selecting particular rows based on multiple attributes of said at least one database object, wherein said optimizer determines an optimal execution path for executing the database query by:

determining selectivity information providing a selectivity estimate for each of said multiple attributes, determining correlation information providing a measure of how well at least some of said multiple attributes are correlated, and based at least in part on said correlation information, combining said selectivity information together for determining a multi-attribute selectivity estimate for the query condition; and an execution unit for executing a query access plan for the database query, said query access plan including an access strategy based at least in part on the determined multi-attribute selectivity estimate.

12. The system of claim 11, wherein correlation between two attributes is determined based on how much a particular value specified in the database query for one attribute depends on a given value specified in the database query for another attribute.

13. The system of claim 12, wherein correlation between two attributes may very between total independence and total dependence.

14. The system of claim 11, wherein said optimizer combines selectivity information by adding selectivity information for an attribute only if a particular value specified in the database query for the attribute is not totally dependent on a given value specified in the database query for another attribute whose selectivity information has been taken into account.

15. The system of claim 11, wherein said determined selectivity information provides a measure of the fraction of rows of said at least one database object that satisfy said query condition.

16. The system of claim 11, wherein each of said multiple attributes corresponds to a particular column of said at least one database object.

17. The system of claim 11, wherein said execution unit formulates a query by determining a particular access path for use by access methods, for executing the database query.

18. The system of claim 11, wherein said at least one database object comprises a database table.

19. The system of claim 11, wherein said at least one database object comprises a database index.

20. The system of claim 11, wherein at least some of said correlation information is stored persistently for the database system.

* * * * *